(12) United States Patent
Aquino et al.

(10) Patent No.: US 11,688,265 B1
(45) Date of Patent: *Jun. 27, 2023

(54) SYSTEM AND METHODS FOR SAFETY, SECURITY, AND WELL-BEING OF INDIVIDUALS

(71) Applicant: Vuetech Health Innovations, LLC, Charlottesville, VA (US)

(72) Inventors: Victor Aquino, Charlottesville, VA (US); Melony Bennis, Woodbridge, VA (US); Tien Comlekoglu, Charlottesville, VA (US); Jefferson Griscavage, Charlottesville, VA (US); Carl Hildebrandt, Charlottesville, VA (US)

(73) Assignee: Vuetech Health Innovations LLC, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,396

(22) Filed: Mar. 11, 2022

Related U.S. Application Data

(63) Continuation of application No. 17/402,583, filed on Aug. 15, 2021, now Pat. No. 11,282,367.
(Continued)

(51) Int. Cl.
*G08B 23/00* (2006.01)
*G08B 21/04* (2006.01)
(Continued)

(52) U.S. Cl.
CPC ......... *G08B 21/0476* (2013.01); *G06V 20/41* (2022.01); *G06V 40/166* (2022.01);
(Continued)

(58) Field of Classification Search
CPC .............. G08B 21/0476; G08B 21/043; G06K 9/00255; G06K 9/00342; G06K 9/00718; G06K 2009/00738
See application file for complete search history.

(56) References Cited

U.S. PATENT DOCUMENTS

| | | | | |
|---|---|---|---|---|
| 2012/0049353 A1* | 3/2012 | Osenbach | ............... | H01L 23/36 257/737 |
| 2012/0314901 A1* | 12/2012 | Hanson | ............... | G08B 21/043 600/595 |

(Continued)

*Primary Examiner* — Dhaval V Patel
(74) *Attorney, Agent, or Firm* — Key IP Law Group, PLLC

(57) ABSTRACT

A system includes video cameras arranged to monitor a vulnerable person, and a processor system that receives video frames from the video cameras, the processor system comprising a processor and a non-transitory, computer-readable storage medium having machine instructions executed by the processor. The processor detects and identifies objects in a current received video frame, classifies an identified object as the person by applying a facial recognition algorithm that identifies the person, determines a posture of the person by identifying joints, limbs, and body parts, and their respective orientations to each other and to a plane, and immediately discards the current video frame. The processor then determines a change in motion, of the person, between the current received video frame and one or more prior received video frames, and, based on the determined posture and the change in motion, determines that the person has experienced a defined event.

An example method for monitoring health and well-being of persons includes a processor integral to a video camera capturing video frames containing raw image data of a scene containing person objects and non-person objects. The processor, for a first video frame, executes video frame operations, including detecting the person objects in the first video
(Continued)

frame, detecting and identifying the non-person objects in the first video frame, identifying and classifying a person object as a person for metric analysis, and determining a posture of the person. The method further includes the processor repeating the video frame operations for second and subsequent video frames; identifying changes in posture of the person from the second and subsequent video frames; using the changes in posture, determining motion of the person; providing person privacy, comprising automatically and immediately following each video frame operation on a video frame, deleting all raw image data of the video frame; and, based on the posture changes and the motion, generating a private, personalized metric analysis for the person. In an aspect, the private, personalized metric analysis includes outcome measures of interest selected from a group consisting of steps taken/distance walked/changes in gait by elderly persons, positional changes for bedridden persons, and developmental milestones in child persons; and the processor conducts the metric analysis over time to identify trends and corresponding changes in a health condition of the person, comprising progress in rehabilitation, deterioration from a degenerative disease, and physical and mental development.

22 Claims, 27 Drawing Sheets

Related U.S. Application Data

(60) Provisional application No. 63/066,296, filed on Aug. 16, 2020.

(51) Int. Cl.
  *G06V 40/20* (2022.01)
  *G06V 40/16* (2022.01)
  *G06V 20/40* (2022.01)

(52) U.S. Cl.
  CPC ........... *G06V 40/23* (2022.01); *G08B 21/043* (2013.01); *G06V 20/44* (2022.01)

(56) References Cited

U.S. PATENT DOCUMENTS

| | | | | |
|---|---|---|---|---|
| 2013/0259390 | A1* | 10/2013 | Dunlop | G06V 20/47 382/224 |
| 2019/0147224 | A1* | 5/2019 | Li | G06N 3/045 382/103 |
| 2019/0326013 | A1* | 10/2019 | Rashidi | G06F 18/24 |

* cited by examiner

EVA ALERTS SYSTEM — INPATIENT REHAB WEST WING

370

PATIENT LIST — 372

| ROOM NUMBER | PATIENT NAME | PRECAUTIONS | STATUS |
|---|---|---|---|
| IPW01 | JAMES WILLIAMS | FALL DETECTION\|FALL PREVENTION\|PRESSURE ULCERS | O |
| IPW02 | JANE SMITH | FALL PREVENTION\|PRESSURE ULCERS | O |
| IPW03 | ROBERT WILLIAMS | | O |
| IPW04 | JOE THOMAS | FALL DETECTION\|FALL PREVENTION | O |
| IPW05 | JIMMY MATTHEWS | | |
| IPW06 | | | |
| IPW07 | JOHN DOE | PRESSURE ULCERS | O |

EVA ALERTS SYSTEM — INPATIENT REHAB WEST WING

370

⚠ DANGER [RESOLVED] — 376
ROOM IPW01 | JAMES WILLIAMS | FALL ALERT

PATIENT LIST — 372

| ROOM NUMBER | PATIENT NAME | PRECAUTIONS | STATUS |
|---|---|---|---|
| IPW01 | JAMES WILLIAMS | FALL DETECTION \| FALL PREVENTION \| PRESSURE ULCERS | ○ |
| IPW02 | JANE SMITH | FALL PREVENTION \| PRESSURE ULCERS | ○ |
| IPW03 | ROBERT WILLIAMS | | ○ |
| IPW04 | JOE THOMAS | FALL DETECTION \| FALL PREVENTION | ○ |
| IPW05 | JIMMY MATTHEWS | | |
| IPW06 | | | |
| IPW07 | JOHN DOE | PRESSURE ULCERS | ○ |

*FIG. 20*

SYSTEM AND METHODS FOR SAFETY, SECURITY, AND WELL-BEING OF INDIVIDUALS

RELATED APPLICATIONS

This application is a continuation of U.S. patent application Ser. No. 17/402,583, filed Aug. 15, 2021 and entitled System and Method for Safety, Security and Well-Being of Individuals, now U.S. Pat. No. 11,282,367 issued Mar. 22, 2022. This application also claims priority to provisional patent application 63/066,296 filed Aug. 16, 2020, entitled System and Method for Safety, Security and Well-Being of Individuals. The disclosures of these patent documents are hereby incorporated by reference.

BACKGROUND

Certain individuals (persons) may require assistance and/or monitoring to ensure their security, safety, and/or well-being. For example, vulnerable individuals, such as elderly individuals with physical or mental impairments, may require some form of assisted living. Other, non-elderly, vulnerable individuals also may require some form of assisted living. Such assisted living may take place in a long-term assisted living facility. Alternately, such assisted living may take place in the vulnerable individuals' homes.

Whether in an assisted living facility or a home, vulnerable individuals, such as those with physical impairments, may be at risk of injury from falls or other injuries while alone. Individuals with cognitive impairments, when alone, may be at risk from wandering, falls, and use of dangerous objects, or may suffer from panic or confusion. Some vulnerable individuals may be bed-ridden or otherwise have limited mobility, and such individuals may be subject to pressure ulcers, commonly referred to as bed sores.

Other vulnerable individuals may require short-term assistance, such as may be provided at a health care facility or hospital by a nurse, a medical technician, or another medical professional or caregiver.

In addition to population-based problems, there are also universal problems in the care of vulnerable individuals, experienced by the vulnerable individual and the caregiver. Universal challenges to the caregiver include time and attention requirements, and monetary costs. The constant, uninterrupted monitoring of vulnerable individuals by a human caregiver is impractical, expensive, and sometimes infeasible. In the setting of a home, a family member or hired caregiver may not always be available to physically watch the vulnerable individual. It is both logically impractical and infeasible to always have eyes on the vulnerable individual because the caregiver will have to carry out other duties. For instance, the caregiver may have to prepare medications, meals, or run errands. Additionally, a hired caregiver can be too costly for many families to afford. In the setting of a formal care facility, such as independent living facilities, assisted living facilities, nursing homes, or hospitals, the number of vulnerable individuals makes it practically impossible for them to be monitored one on one by staff at all times.

Universal challenges to the vulnerable individual are privacy and autonomy. Caregivers and healthcare professionals often worry about the risk of allowing independence of a vulnerable individual. Risk of a fall and subsequent injury in a caregiving environment or restroom may necessitate the presence of a caregiver, and is but one example that results in the loss of a vulnerable individual's independence and privacy.

Current technologies aimed at monitoring vulnerable individuals include wearable pendants, ambient sensors (pressure sensors, motion sensors, magnetic sensors, bed alarms), and camera-based sensors. These technologies all share certain drawbacks which include: they are limited to a specific number of functions, do not provide any higher-level information, and most are reactive rather than predictive. Due to the limited functionality of these technologies, this may necessitate the use of multiple devices which becomes invasive, costly, and cumbersome, and relies on the compliance of individuals to use them (i.e., wearable pendants).

These existing technologies also has specific drawbacks. Wearable systems use sensors such as accelerometers and gyroscopes in the form of a pendant, belt, or watch to detect a fall. While they may be accurate and may send real time alerts, these systems depend on the individual to wear the sensor. Many individuals forget to wear the sensor, or choose not to wear it because the sensor is uncomfortable or cumbersome. Additionally, some sensors require individuals to manually activate an alarm after a fall. An individual who has fallen may not have the cognitive or physical capacity to activate an alarm.

Ambient sensors include sensors such as motion sensors, pressure sensors, and magnetic sensors. These sensors can detect a specific form of activity, such as but not limited to, opening a door (magnetic sensor), standing up from bed (pressure sensor), or entering a room (motion sensor). While ambient sensors may provide some utility, they are expensive, invasive, and cumbersome to install multiple sensors to cover the desired area for monitoring.

Current camera-based monitoring systems may be used to monitor vulnerable individuals. One such system utilizes multiple cameras to cover areas of interest and to provide a video feed to a group of individuals dedicated to remotely watching the camera feed and monitoring for an adverse event, such as a fall. For this reason, current camera-based systems cannot provide privacy, and the constant monitoring fatigues the human observers and increase the cost of monitoring. Other camera-based systems that utilize artificial intelligence-based detection algorithms instead of human observers also do not address the problem of privacy because they still allow human observers to view the video footage.

To set up a home or healthcare facility with current technologies, several modalities may be required to adequately protect the vulnerable individual. For example, to ensure a vulnerable individual does not get out of bed, a bed alarm or pressure sensor must be used. To monitor the vulnerable individual for falls, a wearable device must be used. To ensure the individual does not leave a particular room or the home, multiple motion sensors or magnetic sensors for doors/windows must be used. To gain insight as to what an individual is doing from a remote location, the caregiver must watch a real-time or near-real-time video feed from a camera. Automated camera-based systems exist that allow for basic event detection and alerts such as motion detection and door opening, the current camera-based systems do not provide adequate functionality for monitoring vulnerable individuals. That is, current automated camera-based systems are not designed or adapted for caregiving or for healthcare facilities. Therefore, existing automated camera-based systems, by themselves, are not able to provide adequate functionalities to monitor vulnerable individuals.

SUMMARY

An example automated video monitoring system includes a plurality of video cameras arranged to monitor a vulnerable person, and a processor system configured to receive video frames from a video stream provided by the plurality of video cameras. The processor system may include one processor or multiple processors. The processor system includes a non-transitory, computer-readable storage medium having encoded thereon machine instructions executed by the processors. A processor executes the machine instructions to recognize and identify objects in a current received video frame, and to classify an identified object as the vulnerable person. To classify an object, the processor may apply a facial recognition algorithm that identifies, by name, the vulnerable person, and determines a posture of the named vulnerable person by identifying joints, limbs, and body parts, and their respective orientations to each other and to a horizontal plane, determines a change in motion of the named vulnerable person between the current received video frame and one or more prior received video frames, and based on the determined posture and the change in motion, determines that the named vulnerable person has experienced a defined event. Immediately following, the processor discards the current received video frame.

An example system for monitoring the safety, security, and well-being of a person includes a non-transitory, computer-readable storage medium having encoded thereon, machine instructions executable by a processor to monitor the safety, security, and well-being of the person, where the processor receives raw image data of video frames captured by one or more of a plurality of video cameras; detects and identifies image objects in a current received video frame; classifies an identified image object as a vulnerable person, comprising the processor applying a facial recognition algorithm to the identified image object; determines a posture of the vulnerable person, comprising identifying a plurality of body parts of the vulnerable person, and the respective orientations of the body parts to each other; automatically and immediately following detecting and classifying the image object and determining the posture, deletes the current video frame; and based on the determined posture, determines that the vulnerable person may experience a first defined event. In an aspect, to determine a posture of the vulnerable person, the processor compares the relative orientations of the body parts to one or more of a vertical plane and a horizontal plane. In an aspect, to determine a posture of the vulnerable person, the processor generates a segmented room comprising one or more room segments, a room segment corresponding to a surface of the segmented room; and determines a relationship between the vulnerable person and one or more of the room segments. In an aspect, a segment comprises a floor segment of the segmented room, and wherein the image object comprising the vulnerable person contacts at least a portion of the floor segment. In an aspect, the processor determines an amount of change in posture of the vulnerable person between the current received video frame and one or more prior received video frames; and based on the determined change in the amount of posture of the vulnerable individual, determines the vulnerable person has experienced a second defined event, wherein the second defined event is a fall. In an aspect, the processor determines an amount of change in posture of the vulnerable person between the current received video frame and one or more prior received video frames; and based on the determined change in the amount of posture of the vulnerable individual, determines the vulnerable person may experience a third defined event, wherein the third defined event is a pressure ulcer. In an aspect, to classify the identified object as the vulnerable person, the processor generates a bounding box encompassing the identified image object; and applies the facial recognition algorithm only to the identified image object encompassed in the bounding box.

A method for monitoring safety, security, and well-being of a person includes a processor: receiving raw image data of video frames captured by one or more of a plurality of video cameras; detecting and identifying image objects in a current received video frame; classifying an identified image object as a vulnerable person, in which the processor applies a facial recognition algorithm to the identified image object; determines a posture of the vulnerable person, by identifying a plurality of body parts of the vulnerable person and respective orientations of the body parts; automatically and immediately following detecting and classifying the image object and determining the posture, deletes the current video frame; and based on the determined posture, determines that the vulnerable person may experience a first defined event.

An example system, which provides automated, private, and, personalized metric analyses of persons, includes a video camera system; a processor system configured to receive data from the video camera system; and a non-transitory; and computer-readable storage medium having encoded thereon, machine instructions executable by the processor system to process raw image data of video frames captured by the video camera system. The processor system, for a first video frame, executes video frame operations to produce distilled, contextualized data, including the processor detects person objects in the first video frame; detects and identifies non-person objects in the first video frame; identifies and classifies a person object as a person for metric analysis; and determines a posture of the person, repeats the video frame operations for second and subsequent video frames, identifies changes in posture of the person from the second and subsequent video frames, using the changes in posture, determines motion of the person, provides person privacy, comprising automatically and immediately following each video frame operation on a video frame, deletes all raw image data of the video frame, and based on the posture changes and the motion, generates a private, personalized metric analysis for the person. In an aspect, the processor system includes a first processor built into a first video camera, the first video camera buffers video frames and provides the buffered video frames to the first processor on a rolling basis, the raw image data of the video frames never leave the confines of the first video camera, all processing executed by the processor system is completed within the first video camera, and only the distilled and contextualized data are provided to components external to the system. In another aspect, the private and personalized metric analyses comprise outcome measures of interest selected from a group consisting of steps taken/distance walked/changes in gait by elderly persons, positional changes for bedridden persons, and developmental milestones in child persons; and the metric analyses are conducted over time to identify trends and corresponding changes in a health condition of the person, comprising progress in rehabilitation, deterioration from a degenerative disease, and physical and mental development.

An example method for monitoring health and well-being of persons includes a processor integral to a video camera capturing video frames containing raw image data of a scene containing person objects and non-person objects. The processor, for a first video frame, executes video frame operations, including detecting the person objects in the first video frame, detecting and identifying the non-person objects in the first video frame, identifying and classifying a person object as a person for metric analysis, and determining a posture of the person. The method further includes the processor repeating the video frame operations for second and subsequent video frames; identifying changes in posture of the person from the second and subsequent video frames; using the changes in posture, determining motion of the person; providing person privacy, comprising automatically and immediately following each video frame operation on a video frame, deleting all raw image data of the video frame; and, based on the posture changes and the motion, generating a private, personalized metric analysis for the person. In an aspect, the private, personalized metric analysis includes outcome measures of interest selected from a group consisting of steps taken/distance walked/changes in gait by elderly persons, positional changes for bedridden persons, and developmental milestones in child persons; and the processor conducts the metric analysis over time to identify trends and corresponding changes in a health condition of the person, comprising progress in rehabilitation, deterioration from a degenerative disease, and physical and mental development.

DESCRIPTION OF THE DRAWINGS

The detailed description refers to the following figures in which like numerals refer to like objects, and in which:

FIGS. 18-20 illustrate example information displays generated by the video monitoring system of FIG. 2;

DETAILED DESCRIPTION

Figure 1:
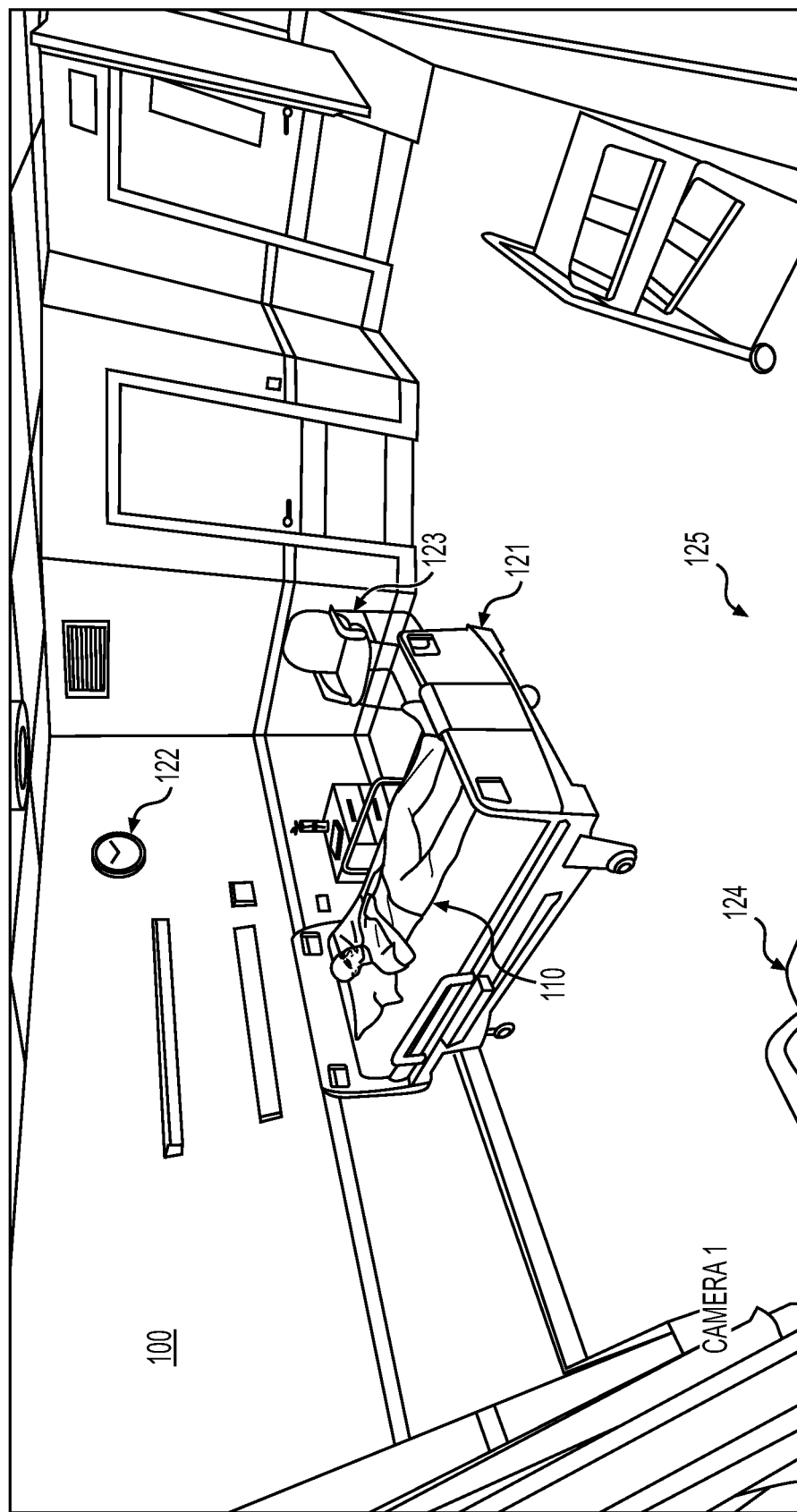
FIG. 1 illustrates a video frame capture of an example environment in which an example video monitoring system may be implemented.

Disclosed herein is a system for predicting an occurrence of events harmful to a monitored, vulnerable person includes a plurality of video cameras arranged to monitor the vulnerable person; and a processor system configured to receive video frames from a video stream provided by the plurality of video cameras, the processor system comprising one or more processors and a non-transitory, computer-readable storage medium having encoded thereon machine instructions executed by the one or more processors. The processor detects and identifies image objects in a current received video frame, classifies an identified object as the vulnerable person, which comprises applying a bounding box to the identified object; and applying a facial recognition algorithm only to the identified object encompassed by the bounding box, the facial recognition algorithm comparing facial data to a database of facial images including the vulnerable person. The processor further determines a posture of the vulnerable person, comprising identifying joints, limbs, and body parts, and their respective orientations to each other and to one or more of a horizontal plane and a vertical plane, immediately following the detecting, classifying, and determining, deleting the current frame, and based on the determined posture determines that the vulnerable person may experience a defined event.

Further, disclosed herein is a method for monitoring safety, security, and well-being of a person includes a processor: receiving raw image data of video frames captured by one or more of a plurality of video cameras; detecting and identifying image objects in a current received video frame; classifying an identified image object as a vulnerable person, comprising the processor applying a facial recognition algorithm to the identified image object; determining a posture of the vulnerable person, comprising identifying a plurality of body parts of the vulnerable person, and respective orientations of the body parts; automatically and immediately following detecting and classifying the image object and determining the posture, deletes the current video frame; and based on the determined posture, determining that the vulnerable person may experience a first defined event. In an aspect, the processor determines a posture of the vulnerable person by comparing the respective orientations of the body parts relative to one or more of a vertical plane and a horizontal plane. In another aspect, the processor determines a posture of the vulnerable person, by generating a segmented room comprising one or more room segments, a room segment corresponding to a surface of the segmented room; and determining a relationship between the vulnerable person and one or more of the room segments. In an aspect, a segment comprises a floor segment of the segmented room, and the image object that is classified as the vulnerable person, contacts at least a portion of the floor segment. In an aspect, the processor determines determining an amount of change in posture of the vulnerable person between the current received video frame and one or more prior received video frames; and based on the determined amount of change in posture of the vulnerable person, determining the vulnerable person has experienced a second defined event, wherein the second defined event is a fall. In another aspect, the processor determines an amount of change in posture of the vulnerable person between the current received video frame and one or more prior received video frames; and based on the determined amount of change in posture of the vulnerable person, determining the vulnerable person may experience a third defined event, wherein the third defined event is a pressure ulcer. In an aspect, the processor classifies the image object as the vulnerable person by generating a bounding box encompassing the identified image object; and applying the facial recognition algorithm only to the identified image object encompassed in the bounding box. In an aspect, the processor generates a confidence level for an accuracy of the classifying; determines the generated confidence level is less than a desired confidence level; and deletes the image object. In an aspect, the first defined event is a fall, and the processor generates a potential fall alert; and provides the potential fall alert to a caretaker attending to the vulnerable person.

Still further, disclosed herein is a video monitoring system (and corresponding methods), that allows automated detection of events related to caregiving and health care, such as, but not limited to, falls, pressure ulcers, wandering, postural hypotension, use of dangerous objects (stove, fireplace, knives, etc.), seizures, and choking, while maintaining the privacy of vulnerable individuals (that is, vulnerable persons) in intimate situations such as, but not limited to, a bathroom, a hospital room. The video monitoring system, in addition to automated detection of events, also implements a predictive function that may warn caregivers that a possible adverse event may occur to a vulnerable person.

The description of this video monitoring system, with its automated event detection and automated event prediction, begins with reference to a specific scenario involving long-term health care of a vulnerable person by a dedicated caregiver. However, the video monitoring system is not limited to this specific scenario, as one skilled in the art will readily recognize. In addition, implementation of the video monitoring system, and its corresponding use, is described with reference to other scenarios.

In describing the video monitoring system in the context of a health care scenario, the detailed description refers to the following terms and their associated meanings:

Vulnerable person, as used herein, is a human of any age who needs or is provided with some form of health care, or other type of care, for a prescribed period, which may be short-term health care such as might be expected at a hospital (although some long-term health care scenarios may exist at a hospital) or long-term health care which may be provided in the vulnerable person's home, at an assisted living center, nursing home, or other long-term health care facility. During the prescribed period (e.g., weeks, months, years), the health care may be provided 24 hours per day, or only for a portion of a day.

Caregiver, as used herein in some scenarios, is a medical professional such as a nurse, doctor, or medical technician, or other person assigned to tend to, assist, and care for a vulnerable person. A caregiver may be assigned to a single vulnerable person or to multiple vulnerable persons. In other scenarios, the role and functions of a caregiver may be filled by a guard or similar observer.

Object, as used herein may be a human (e.g., a vulnerable person or a caregiver), may be an animal, or may be inanimate. An object may refer to a thing (e.g., another human, an animal, or an inanimate object) that a vulnerable person may encounter during a period of the provided health care. Inanimate objects may be fixed or capable of motion. An inanimate object may have a fixed structure, orientation, or shape or a changeable structure, orientation or shape. The herein disclosed video monitoring system includes features and components that can distinguish between individuals (humans), animals, and inanimate objects.

Observer, as used herein, when employed, is distinct from a caregiver. An observer is a human who may monitor or view information related to a vulnerable person. When employed, an observer may cooperate with a caregiver to ensure the safety, security, and well-being of a vulnerable person. An observer may, but need not, be collocated with the caregiver. In scenarios in which an observer is not employed, some or all functions of the observer may be implemented by the video monitoring system in an automatic and autonomous fashion, and/or may be executed by the caregiver.

The herein disclosed automated video monitoring system (and corresponding method) provides individualized risk management, metric tracking, and event prediction and detection while at the same time, protecting privacy of vulnerable persons in health care scenarios as well as in other scenarios. In an example, the system captures image data (i.e., images of objects and data defining and characterizing the images, and thus the objects) in video frames from a live video feed. The system then employs facial recognition (for human objects) and object detection software to generate a higher-level representation of the images, and employs algorithms to identify and analyze specific features and interactions of objects and persons of interest (e.g., vulnerable persons, caregivers, etc.) within the captured video frames. The system then compares the analyzed features and interactions with predetermined parameters of events of interest, evaluates the occurrence of specific events based on comparison algorithms, and generates appropriate notifications to third-parties, such as caregivers. In an aspect, the system may execute predictive algorithms to forecast a potential event of interest, and to provide appropriate notifications to third-parties. In an aspect, the system may store specific outcomes-measures. Finally, the system deletes the original image data in the capture video frames as soon as data required for the above functions is extracted from the video frames.

The video monitoring system may be employed for monitoring of vulnerable individuals in private or intimate settings (i.e., in the home, bathrooms, changing rooms, etc.) because, through its operations, information-rich data may be extracted while protecting the privacy of the vulnerable individual. These system features allow for: (1) real-time alerts to third-parties if an emergency/high risk event is detected or predicted (i.e., falls, seizures), and (2) evaluation of longitudinal, personalized metric tracking for outcome measures of interest (e.g., steps taken/distance moved for elderly persons, positional changes in bedridden persons, developmental milestones in children).

The video monitoring system may be implemented in hospitals, private homes, and assisted-living facilities. The system and corresponding method represent significant technological advances over current systems and methods. The system and corresponding method provide technologically-advanced remote event monitoring by third-parties of vulnerable persons that allows rapid response to adverse events without constant/continuous human observation. The advanced remote event monitoring ensures the safety, security, and well-being of vulnerable persons while simultaneously protecting their privacy and autonomy. The system's longitudinal metric tracking may be applied to future research or safety initiatives in order to improve health interventions and outcomes for the monitored vulnerable persons.

FIG. 1 illustrates a video frame capture of an example environment in which an example video monitoring system may be implemented. In FIG. 1, environment 100 (i.e., room 100) is a private resident room of a hospital in which vulnerable person 110 (i.e., a patient) is recuperating. The room 100 can be seen to have a door opening to a hallway of the hospital and a door opening to a private restroom. Objects in the room 100 include bed 121, clock 122, chairs 123 and 124, and floor 125. The image represented in FIG. 1 is a single video frame (i.e., a raw image) captured by a camera (not shown in FIG. 1), which is a component of the video monitoring system (also not shown in FIG. 1). Overlaying the video frame may be a camera identification (in the example of FIG. 1, the camera is identified as camera 1) as well as a frame sequence number (not shown). In the disclosure that follows, our patient, or vulnerable person 110, James Williams, will experience one or more "events" while in the example environment 100, and the disclosure describes how those "events" are detected, analyzed, contextualized, and reported through operation of the video monitoring system.

Figure 2:
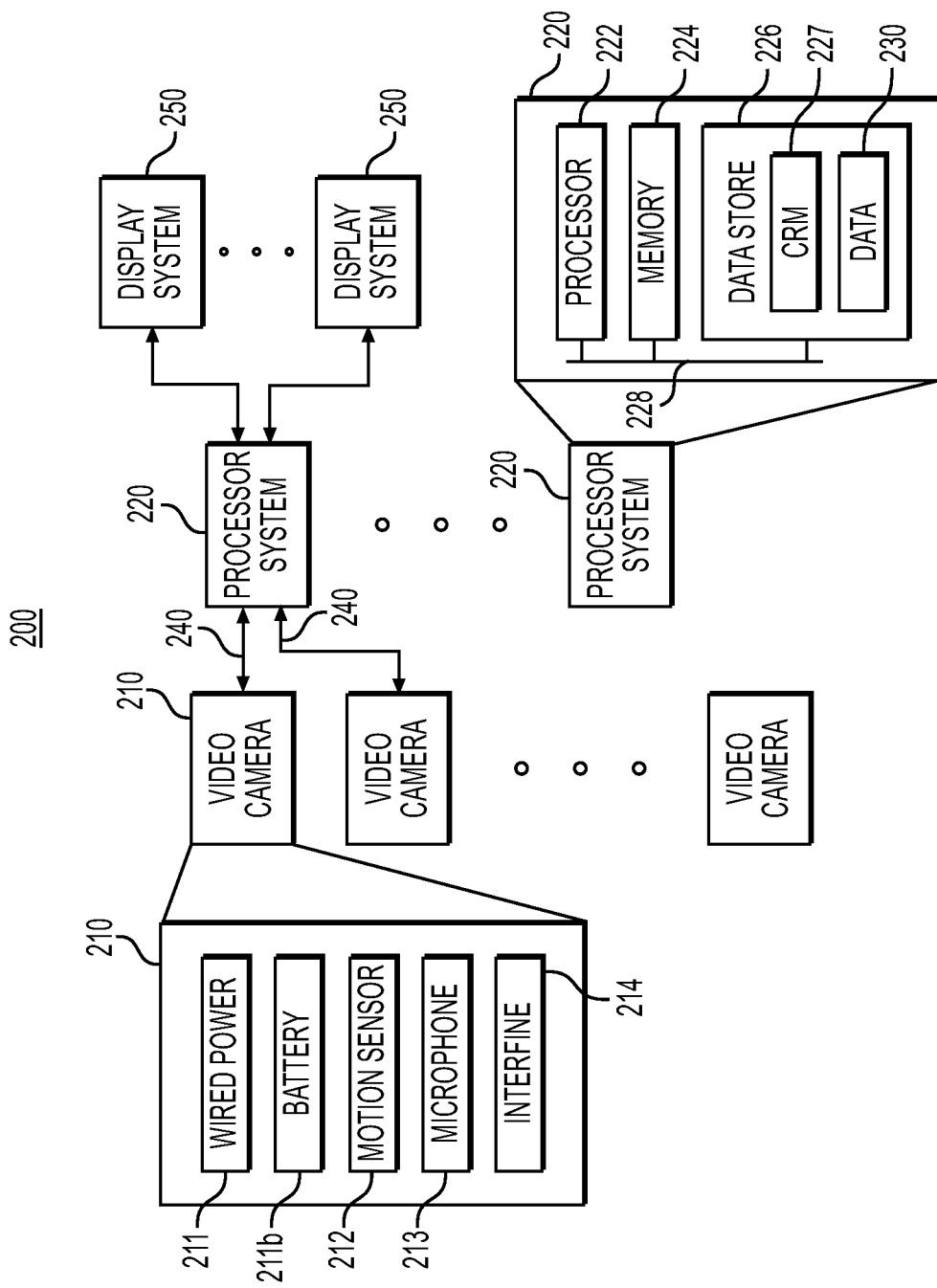
FIG. 2 is a block diagram illustrating the example video monitoring system of FIG. 1.

FIG. 2 is a block diagram of hardware components of the example video monitoring system. In FIG. 2, example video monitoring system 200 includes one or more video cameras 210, one or more processor systems 220, one or more data transmission systems 240, and one or more display systems 250. A camera 210 may be capable of capturing a wide field of view. A camera 210 may be configured to operate in multiple illumination states including very low light states. A camera 210 may include a normal wired power supply 211 as well as a back-up battery power supply 211b. The wired power supply may be hard-wired. A camera 210 may be programmed for continuous recording or may be programmed to record based on the occurrence of some detected activity within its field of view. For this later capability, a camera 210 may include a motion detector 212 and/or a microphone 213. A camera 210 may include a data transmission mechanism 214 that provides for communication with the processor system 220. The data transmission mechanism 214 may be used to transmit video frames to the processor system 220. The data transmission mechanism 214 may be configured to transmit data other than video frames to the processor system 220. In an aspect, video frames to be transmitted to the processor system 220 may be transmitted in real time; that is as soon as acquired and without buffering in the video camera 210. However, the video camera 210 may incorporate a buffer to hold video frames in a situation when data traffic slows reception at the processor system 220. In an example, the video monitoring system 200 may employ multiple processor systems 220 to accommodate expected data flows. A processor system 220 may include a processor 222, memory 224, data store 226, and data bus 228. The data store 226 may include non-transitory, computer-readable storage medium 227 having encoded thereon, a machine instruction set for executing the functions of the video monitoring system 200. The data store 226 also may store data 230 extracted by operation of the processor system 220 from the captured video frames; however, such stored data does not include any video images from the video frames. The data store 226 may store digital images of vulnerable persons 110 and of caregivers to be used for facial recognition. These digital images of vulnerable persons may be acquired from the vulnerable person's medical file. An example machine instruction set is disclosed in more detail herein, including with respect to the description of FIG. 3. The data transmission system 240 may be configured as a wired local area network, for example, that couples cameras 210 to processor systems 220. Alternately, the data transmission system 240 may be implemented as a wireless network. In an example, some components of the video monitoring system 200 may be located remotely (e.g., in the cloud). The display system 250 includes hardware components that may provide visual and/or audible alerts to caregivers and other authorized observers and medical professionals. However, in an example, data presented on the display system 250 are confined only to analyzed and contextualized data, and alerts, and display system 250 does not display video frames. An example hardware component of the display system 250 may be a wearable display device such as a smartwatch having a specific application installed. Other hardware components include standard monitors available, for example, at a hospital's nursing station or similar location.

Figure 3:
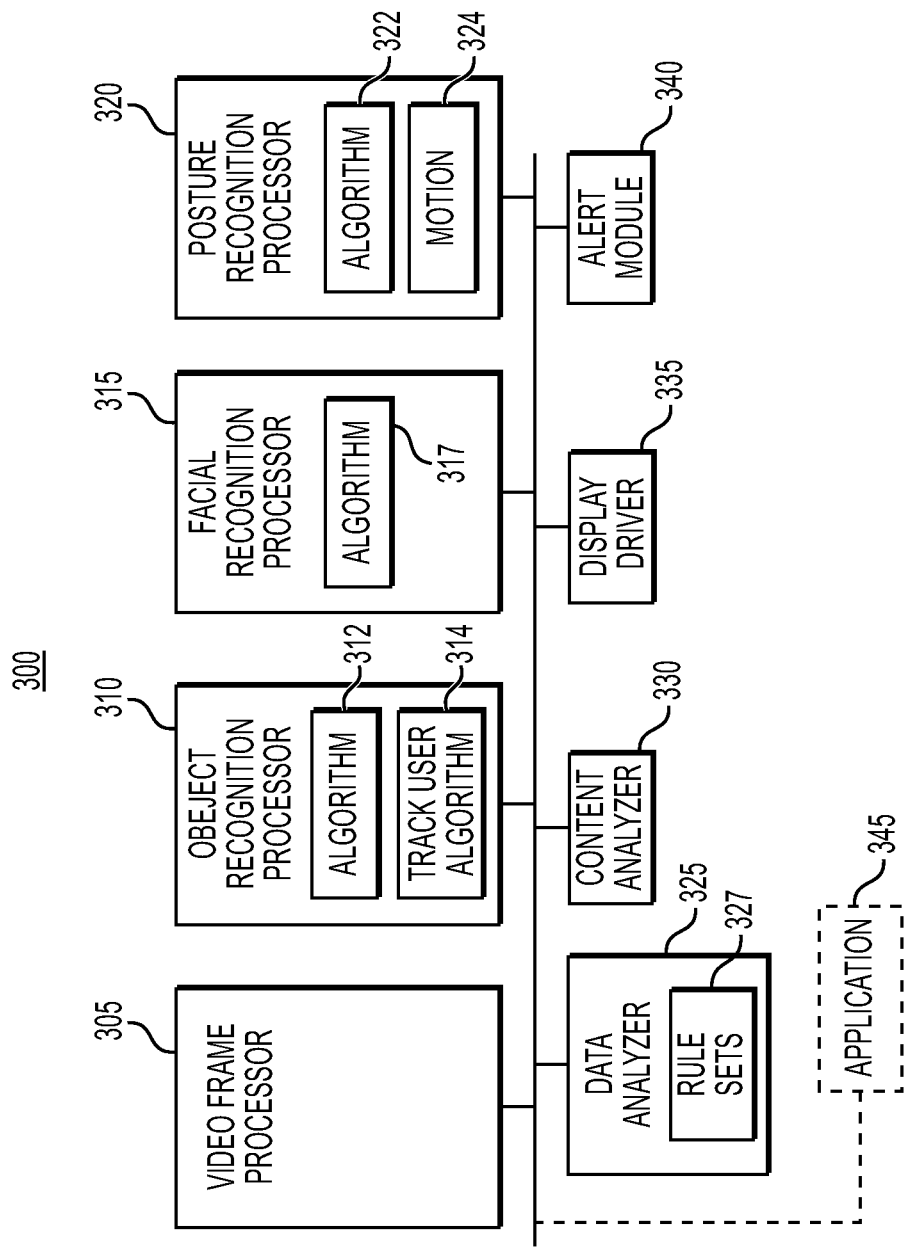
FIG. 3 is a block diagram of software components of the example video monitoring system.

FIG. 3 is a block diagram of software components of the example video monitoring system. In FIG. 3, example software system components 300 includes video frame processor 305, object recognition processor 310, facial recognition processor 315, posture recognition processor 320, data analyzer 325, context analyzer 330, display driver 335, alert module 340, and remote data display application 345. The components 300 (with the exception of application 345) may be loaded into memory 224 from data store 226 to be executed by processor 222 (see FIG. 2). A component 300 of the software system is described briefly as follows, and in more detail elsewhere in this disclosure. Video frame processor 305 receives a video frame captured by video camera 210, indexes the video frames, records the video source and time received, and executes any required pre-processing operations and image enhancement operations including decryption (if received encrypted), pixel interpolation (if received compressed), gamma correction, and other routine digital image processing operations. The video frame processor 305 may receive video frames at a rate of approximately 5-10 frames per second, and may process (i.e., extract all required data) in a frame in a time of about 0.05-0.1 seconds. Multiple processors 222 may be used when multiple cameras are employed as well as to increase the number of frames processed per second from a single camera.

Object recognition processor 310 operates to recognize objects in the environment (e.g., the environment 100 of FIG. 1) using trained object recognition algorithm 312 and object motion or tracking algorithm 314. The algorithm 312 may be trained using, for example, a neural network, to recognize humans, animals, and inanimate objects. In an aspect, the algorithm 312 may be trained to recognize specific vulnerable persons and specific caregivers. Object recognition algorithm 312 is executed to first, detect discrete objects in the environment 100, second, identify all discrete detected objects in the environment 100, and third to determine locations of the identified objects in the environment 100 through use of a bounding box in the image. An aspect of object recognition algorithm 312 is executed to identify as humans (i.e., individuals), certain objects initially detected as objects in the environment 100. In this aspect, the algorithm 312 may compare characteristics of a detected object to a database of human forms, the database of human forms including forms for males, females, adults, children, and forms of such humans in various postures, including standing and siting, for example. To improve the accuracy of object recognition, the object recognition processor may employ boundary boxes (see, e.g., FIGS. 17A and 17B) in which the object is, or is expected to be located. For example, the algorithm 312 may be applied to a bounding box to multiple objects in the environment 100, and the algorithm 312 takes into account the relationship of the bounding boxes of the multiple objects relative to a specific bounding box when attempting to identify an object in the specific bounding box. Then, when attempting to identify an object in the specific bounding box, the algorithm 312 uses image data only for the image created by the specific bounding box, using that image data to search for the object within the specific bounding box. Use of such boundary boxes for static object recognition are known in the art. The object recognition algorithm 312 may be trained to recognize a human object based only on detection of the person's face, since in some scenarios, the entire human form, or a significant portion of the human form, may not be directly visible in a video frame.

Object tracking algorithm 314 executes to track or follow an identified object in the environment 100. The object tracking algorithm 314 combines information from a history of known object locations within environment 100 and computes how an object moves between video frames. Because some objects may change shape or move, boundary boxes used with algorithm 312 may be adapted to move and/or change shape as objects move or change shape. Object tracking provides information about an identified object in the video frame, and how an object moves. A video frame may be time-stamped (with, for example, the time registered for the video frame), annotated with camera identification, and saved for subsequent use by components of the processor system 220. In an aspect, the object tracking algorithm 314 receives as an input, results of a room segmentation operation. For example, considering FIG. 1, room 100 can be seen to include a number of surfaces with which objects, including Mr. Williams 110 may interact. One such surface is floor 125, and Mr. Williams 110 may be standing on the floor 125, with an upright or a bent over posture, may be sitting on the floor 125, or may be lying on the floor 125. Other postures are possible. One purpose of segmenting a room is to allow the algorithm 314, and other aspects of the processing system 220, to better track or follow a both a generally stationary object such as bed 121, as well as moveable objects, such as a person, from frame to frame. Continuing with this example, bed 121 should generally align with, or interact with floor 125. For example, were the bed 121 to be viewed by the processor system 220 as attached to a wall, an obvious error condition would exist—one possible cause would be inadvertent or unintended movement of camera 1 in FIG. 1. Similarly, in following Mr. Williams 110 frame to frame, the algorithm 314 may receive an input as to which, if any, room segments (e.g., floor 125) Mr. Williams has contacted.

Facial recognition processor 315 operates to recognize vulnerable persons such as vulnerable person 110 of FIG. 1 using trained facial recognition algorithm 317 (the algorithm 317 will be seen later to identify our vulnerable person 110 as James Williams). The facial recognition processor 315 also may recognize other individuals such as caregiver 140 (see FIG. 17A). To identify an individual, the algorithm 317 is executed using a pre-existing database of facial identities. In the environment 100, Mr. Williams' face may be registered in the pre-existing database of facial identities. Additionally, caregivers such as caregiver 140 of FIG. 17A, may have their faces registered in the pre-existing database of facial identities. If the person's face matches one of the facial identities in the database, the person is identified. If the face of the person does not match one of the identities in the facial identities database, or if the person is not facing the camera 210, the person may be designated as an unknown person. The person's identity status, known or unknown, and when known, the actual name or other identification of the known person is associated with the corresponding object, and stored for subsequent use by the processor system 220.

Posture recognition processor 320 operates to recognize the posture (e.g., sitting, standing, bent over, lying) of the vulnerable person, or other person, using trained posture recognition algorithm 322. The algorithm 322 may be trained using a neural network. The processor 222 executes posture recognition algorithm 322 to identify and track the postures of persons identified by facial recognition as well as unidentified persons in environment 100. The algorithm 322 is executed to analyze the position of joints and anatomical landmarks in relation to each other to determine the posture of the person. Since the location of a person in the video frame has been established already, the algorithm 322 may be executed to apply postural analysis to just the portion of the video frame (raw video image) containing the person, allowing for a reduction in overall computation load and to improve the accuracy of the posture analysis. To effectuate this reduction in computational load, the algorithm 322 may use or establish a boundary box, such as those shown in FIGS. 17A and 17B, encompassing the person. Motion algorithm 324 is executed to compare the person's posture in the current video frame to the person's posture in previous video frames in order to compute how a person is moving or changing posture. For example, the algorithm 324, in cooperation with algorithm 312, may detect movement of joints frame-to-frame, such as a knee joint that is bent 90 degrees in a first frame and is straight in the next frame or a subsequent frame. The rapidity of joint (and posture) change may be determined based on the number of frames over which joint motion (i.e., joint flexion, posture change) is detected. Thus, an event of a person falling may occur over fewer frames than the same person purposely moving from a standing position to sitting or lying on the floor. The person's posture and posture changes may be saved for subsequent use by the processor system 220. Furthermore, in an aspect, the algorithm 324 may receive an input relating the vulnerable person 110 to a vertical plane (i.e., a plane parallel to the wall segments of room 100) and/or a horizontal plane (i.e., a plane parallel to the floor segment (floor 125) of room 100). Such inputs may improve the accuracy of the posture analysis process.

Data analyzer 325 receives outputs from the processors 315 and 320 to determine a current status of vulnerable person 110 using, for example, pre-defined rule set 327.

Context analyzer 330 receives the current status of vulnerable person 110 as well as the output of processor 310 to determine if vulnerable person 110 has experienced a defined event, or to predict if vulnerable person 110 may experience a defined event.

In operation, the data analyzer 325/context analyzer 330 of the processor system 220 cooperate to combine the information collected (the locations and movement of the objects, the person's identity, and the person's posture and movement) to make decisions about the scene by applying predetermined ruleset(s). When data present in a current video frame are not sufficient to recognize an object, especially a human object, the data analyzer/context analyzer 330 may access data from prior frames to confirm that the identity of the object. To support this "look back" analysis, the processor system 220 may store prior video frame extracted data in data store 226. To reduce storage demands, the data store may retain data according to the time since extraction. For example, data from the last one minute of video frames may be stored in detail while earlier data may be aggregated or summarized. In an aspect, the data stored in data store 226 may be transferred to a long-term storage facility (not shown). Predetermined ruleset(s) (e.g., rule set 327) may be customized for different scenarios, person, and environments. Predetermined rulesets may be designated to specific known or identified persons, all persons, or unknown persons. A ruleset may be used to check a set of predetermined conditions, and if the conditions are met, may present an alert requirement to the alert module 340.

Display driver 335 provides the graphical displays, text alerts and audio alerts for display on devices operated or monitored by caregiver 140 and other personnel charged with ensuring the safety, security, and well-being of vulnerable person 110.

The alert module 340 generates an alert to the appropriate caregiver or observer. The alert may provide a specific textual description of the visual information captured by the video camera 210. The textual description allows for the preservation of critical information obtained visually, without a human observer to view captured video footage. The alert may be sent in multiple forms, including but not limited to a call, text, a visual display, and audible signal, or a push notification, or combinations of these forms to a mobile device, an email, a pager, or a local alarm.

Remote data display application 345 may operate in conjunction with system components 300 and may be loaded onto a portable display device such as a smartwatch worn by caregiver 140.

Figure 4:
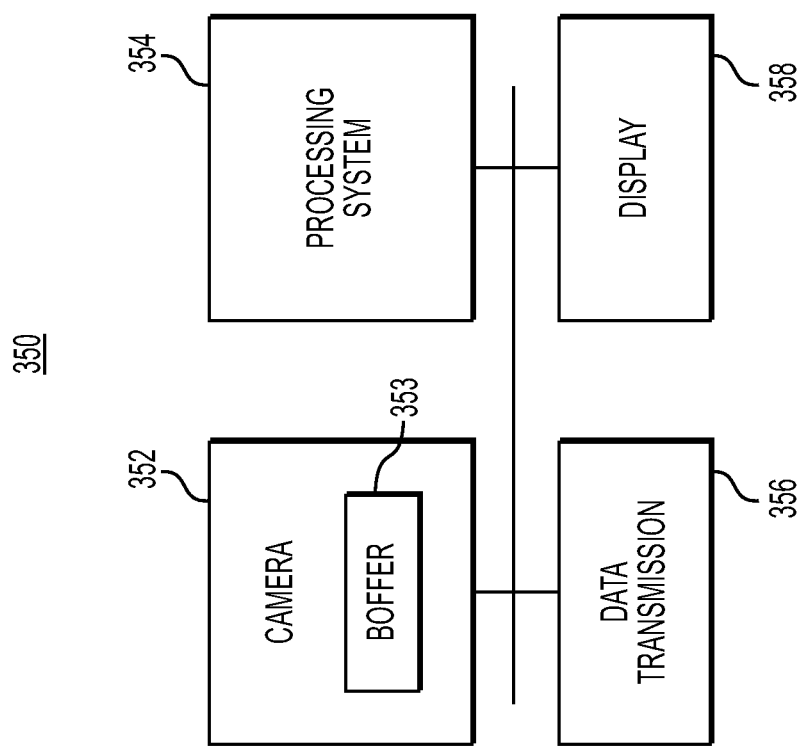
FIG. 4 is a block diagram of another example video monitoring system.

FIG. 4 is a block diagram of another example video monitoring system. In FIG. 4, video monitoring system 350 includes combined video camera(s) 352 and processing system(s) 354. The video monitoring system 350 further includes a data transmission system 356 linked to the processing system 354. Video camera 352 is similar in most respects to video camera 210 of FIG. 2. However, video camera 352 buffers (in buffer 353) video frames acquired during video monitoring operations and provides the captured video frames to the processing system 354 on a rolling basis. Video processing system 354 is built into the video camera 352 such that captured video frames never leave the confines of the video camera 352. Thus, all processing executed by the processor system 220 of FIG. 2 and the software system components 300 of FIG. 3 is completed within the video camera 352 by processing system 354, and only analyzed and contextualized data are provided to other components of the video monitoring system 350. The analyzed and contextualized data generated by the processing system 354 is sent to the data transmission system 356, where such data are prepared for and transmitted to one or more displays 358 to display the analyzed and contextualized data, and any alerts, to a human observer or caregiver 140 (see FIG. 17A). The transmitted data may be encrypted for transmission and may be sent wirelessly, or over a wired network (not shown). In an aspect, the transmitted data (e.g., an event alert, or an event forecast) may be sent to a wearable display device (smartwatch with an appropriate application, such as application 345 (see FIG. 3)) worn by caregiver 140. In an aspect, data displayed on the displays 358 may include the name of the concerned person (e.g., Mr. Williams). In an aspect, the person's name may be toggled off.

Figure 5:
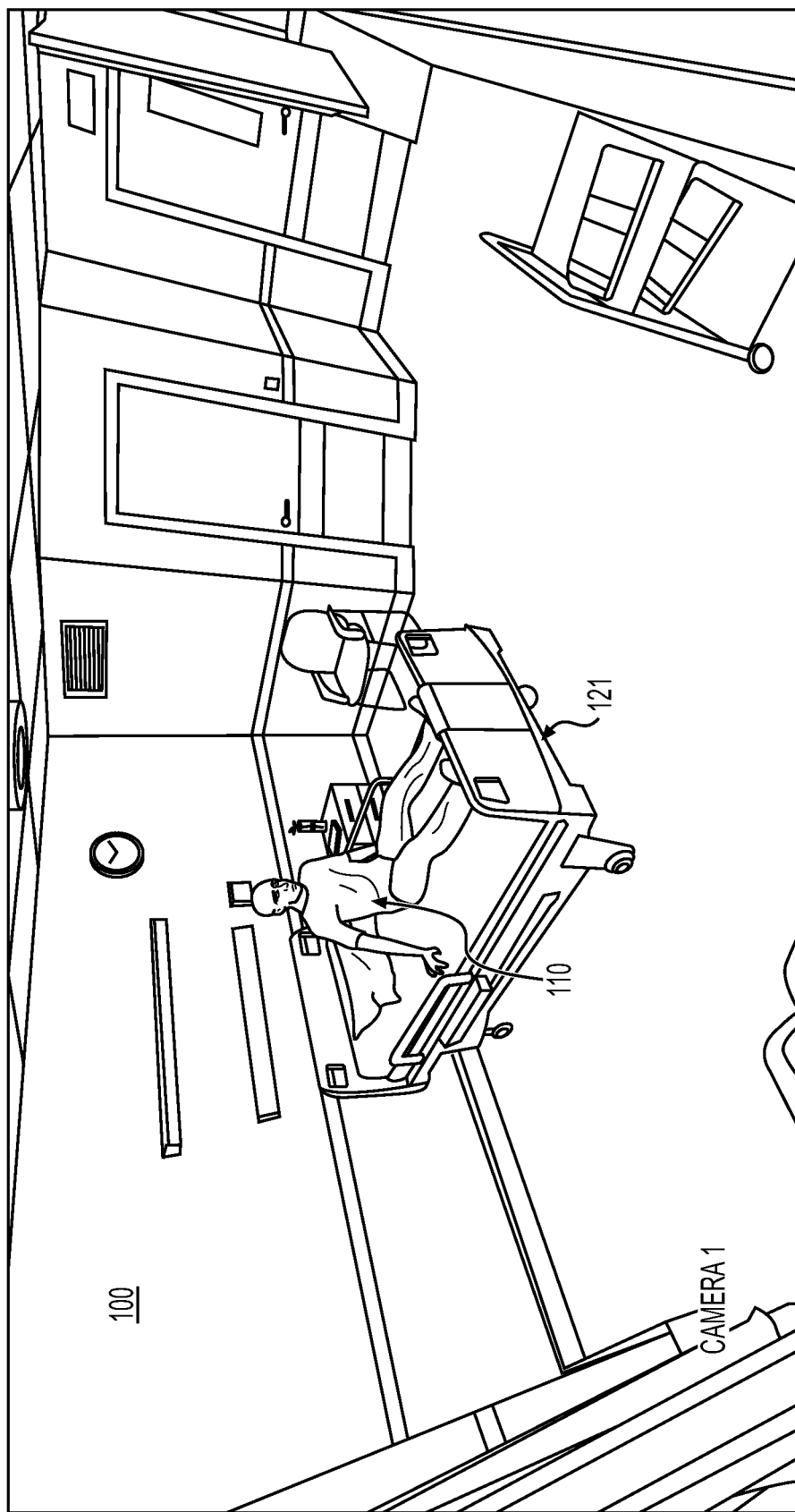
FIGS. 5-8 represent video frames captured by the video monitoring system during an event occurring in the example environment of FIG. 1.
Figure 6:
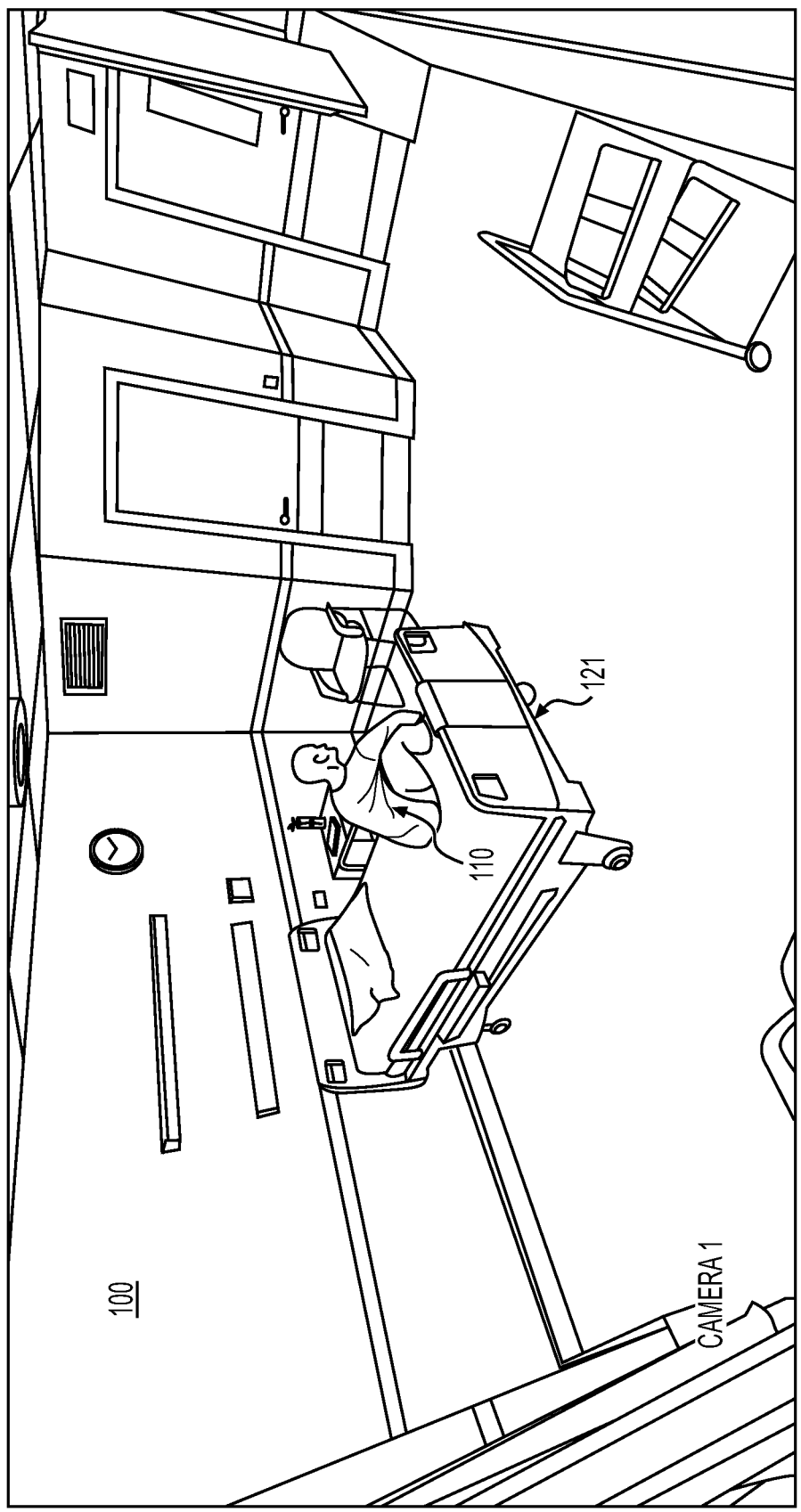
Figure 7:
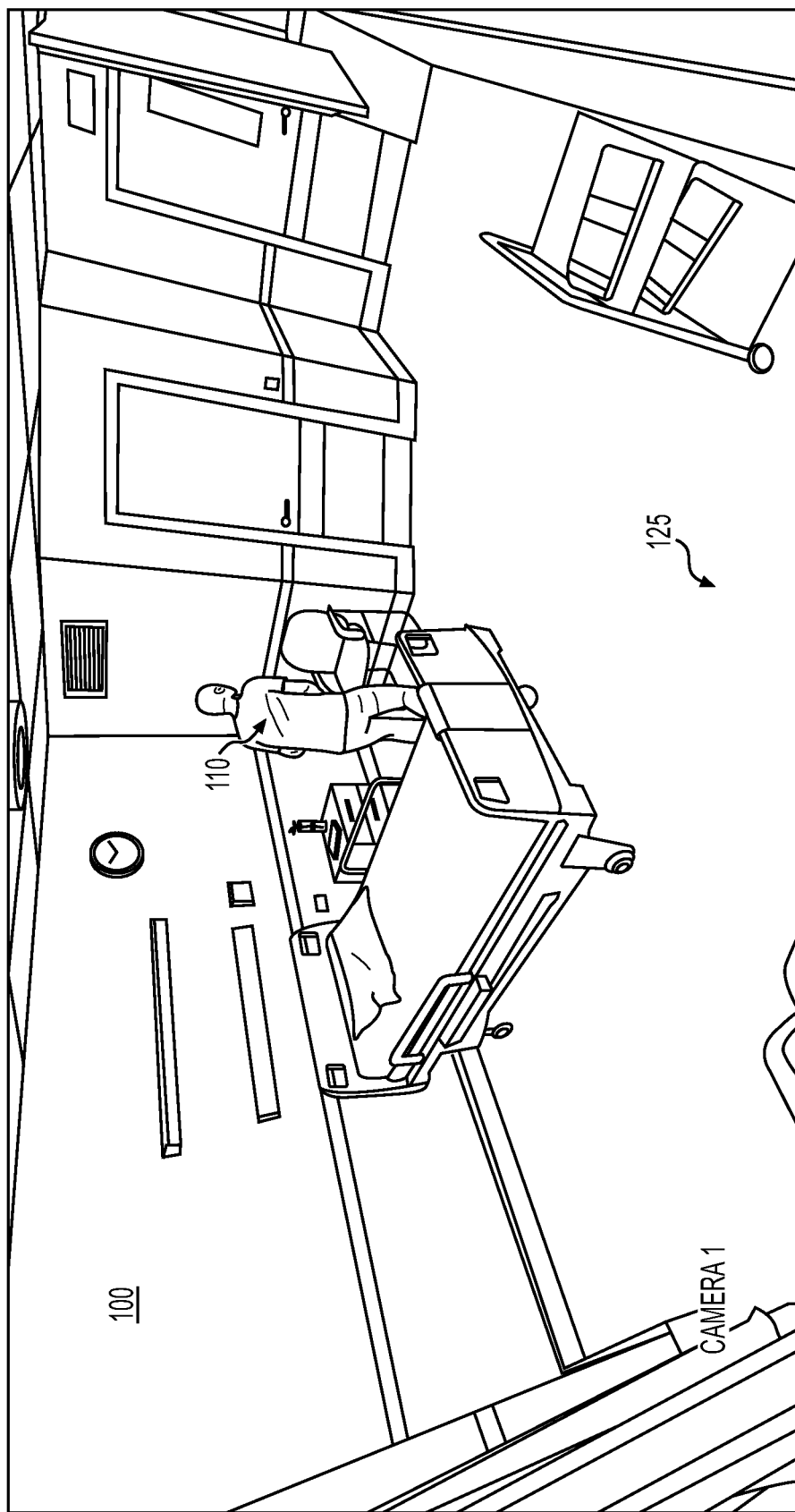
Figure 8:
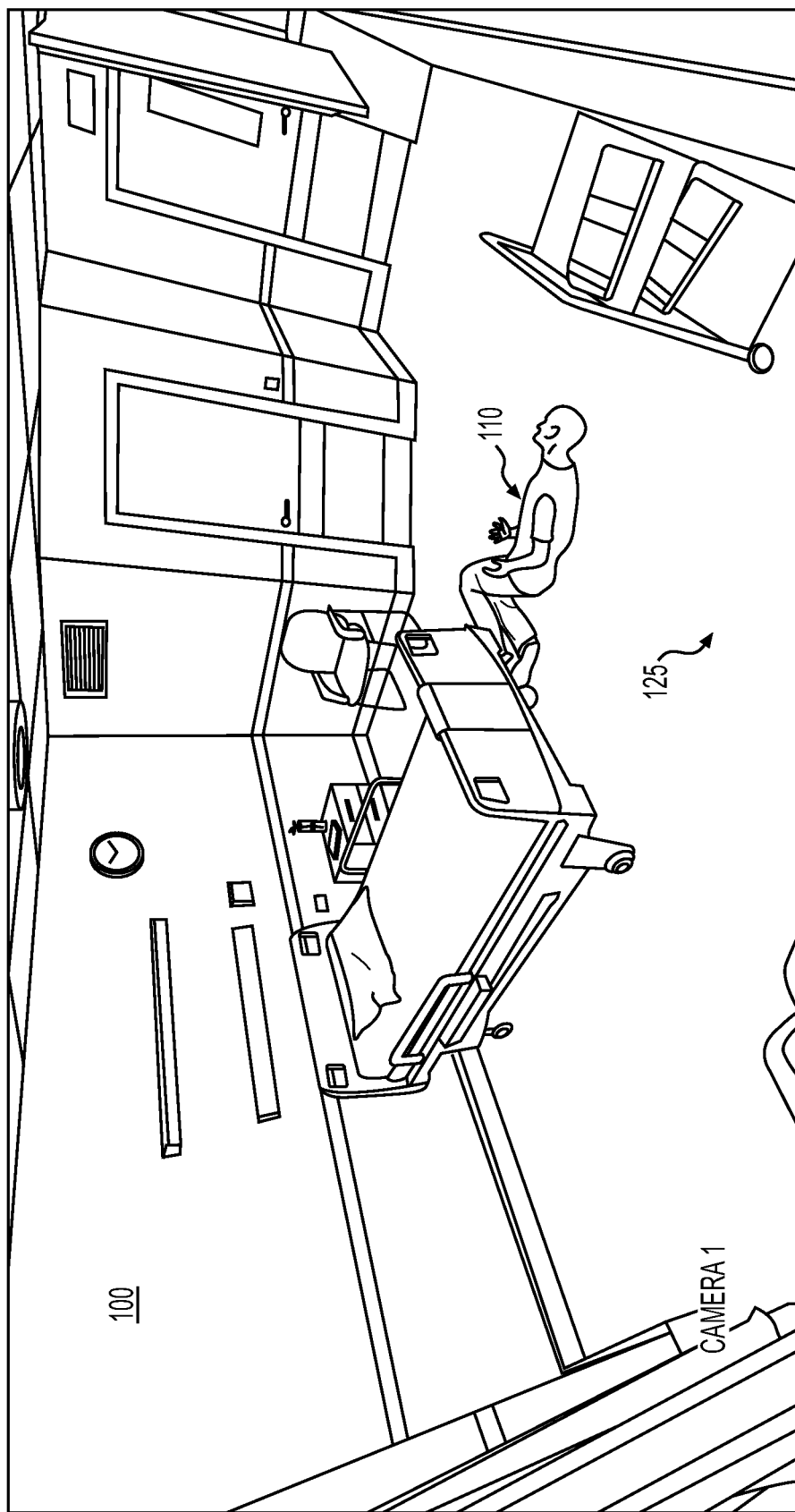

FIGS. 5-8 represent raw video frames captured by the video monitoring system 200 during an event occurring in the example environment 100 of FIG. 1. In FIG. 5, our vulnerable person 110, James Williams, is shown sitting up in bed 121. In FIG. 6, Mr. Williams has changed posture and moved to the edge of bed 121 as if getting ready to stand up. In FIG. 7, Mr. Williams is standing up on floor 125, but is not completely upright, which posture might presage a fall. In FIG. 8, Mr. Williams is lying on floor 125. However, FIG. 8 does not provide sufficient information to allow the processor system 220 to determine if Mr. Williams fell to the floor 125. Note, however, that given normal video camera frame rates, a number of video frames may exist between those shown in FIGS. 7 and 8, and those intervening video frames might indicate, through posture analysis, that Mr. William had fallen to the floor 125.

Figure 9:
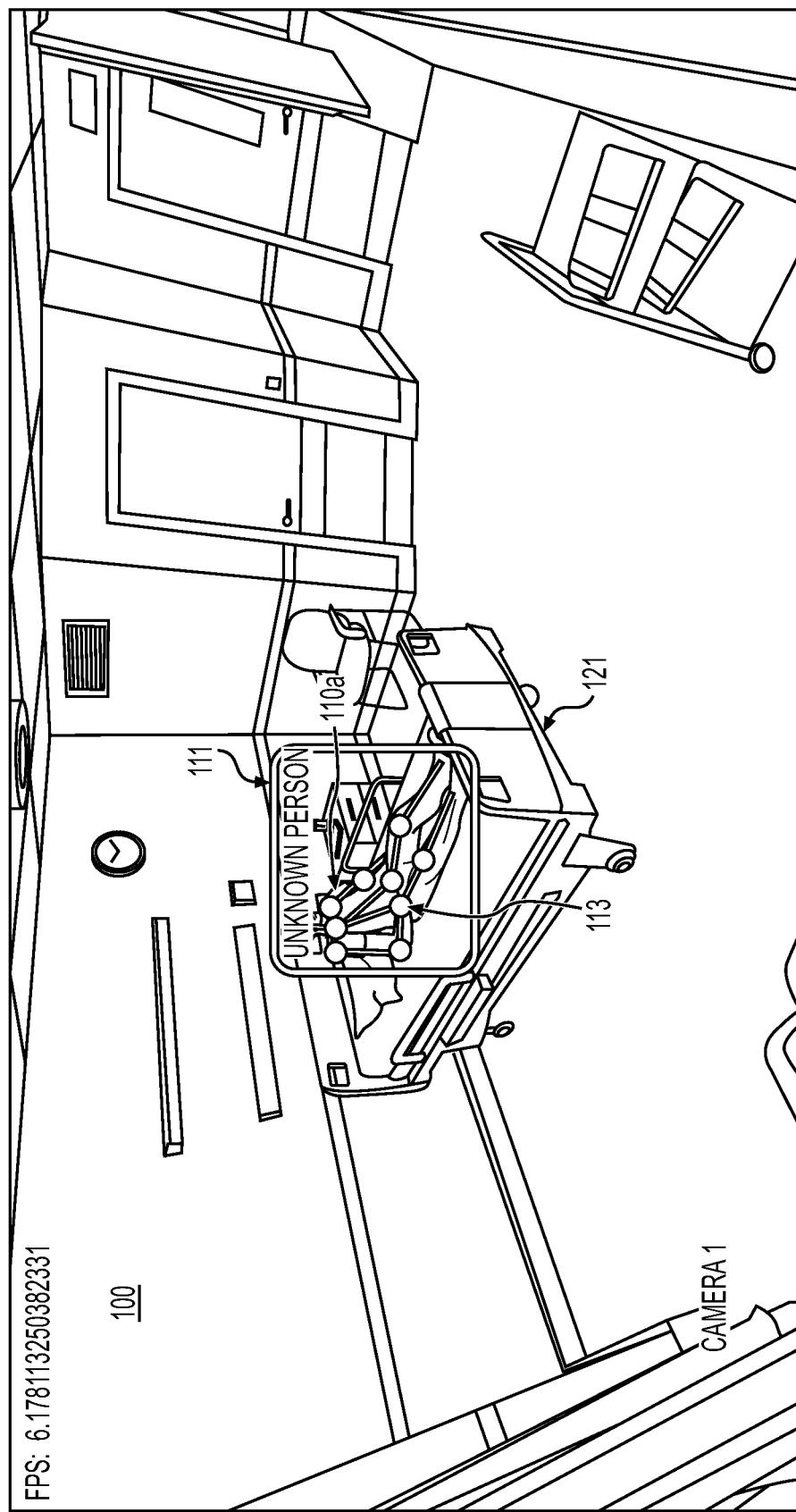
FIGS. 9-12 represent analyzed video frames captured by the video monitoring system during an event occurring in the example environment of FIG. 1.

FIGS. 9-12 represent aspects of analysis of raw video frames captured by the video monitoring system 200 during an event occurring in the example environment 100 of FIG. 1. Note that in FIG. 9, the processor system 220 has yet to identify the object in the bed 121 as Mr. Williams. However, the processor system 220 has at least determined that there is a distinct object in the bed 121 and that that object is a human (or a person), and so the processor system 220 designates the person as "unknown person" 110*a*. To get to this designation, the processor system 220 may first detect an object in the bed 121. Such detection may result from application of object recognition algorithm 312 to the video frame shown in FIG. 9. In an aspect, the algorithm 312 has been trained to recognize a bed (bed 121). The algorithm 312 then would detect some object in close relation to bed 121. Using, for example, a background subtraction process, the algorithm 312 may subtract the pixels conforming to the bed 121 leaving an object whose shape the algorithm 312 then recognizes as that of a human (i.e., an individual). Rather than, or in addition to, pixel subtraction, the algorithm 312 may use edge detection techniques to identify the object on the bed 121 as a distinct object and further to identify the object as an individual. Of course, in many situations, a person lying in bed 121 would be covered, thereby complicating the processing of recognizing the presence of an object and then identifying the object as an individual. However, complicating the process does not prevent reaching the same conclusion, and the algorithm 312 may be trained to recognize a covered person. To further analyze the detected but unknown person 110*a*, the posture recognition algorithm 322 may construct boundary box 111 to encompass all recognized portions of the person 110*a*. This bounding box does not actually appear in the video frame, and is shown in FIG. 9 (and in other figures herein) for ease of description. However, the bounding box 111 is referenced to the video frame; for example, the boundaries of the bounding box 111 may be stated in terms of pixel positions. Using a bounding box may limit the computational load placed on the processor system 220. In addition to the bounding box 111, the processor system 220 may generate nodes 113 corresponding to the joints of the person 110*a* with lines connecting the nodes. As with the bounding box 111, the nodes and lines do not exist in the video frame and are shown for ease of description. Application of the object recognition algorithm 312 and the posture recognition algorithm 322 indicates that the person 110*a* is in a semi-sitting position on the bed 121.

Figure 10:
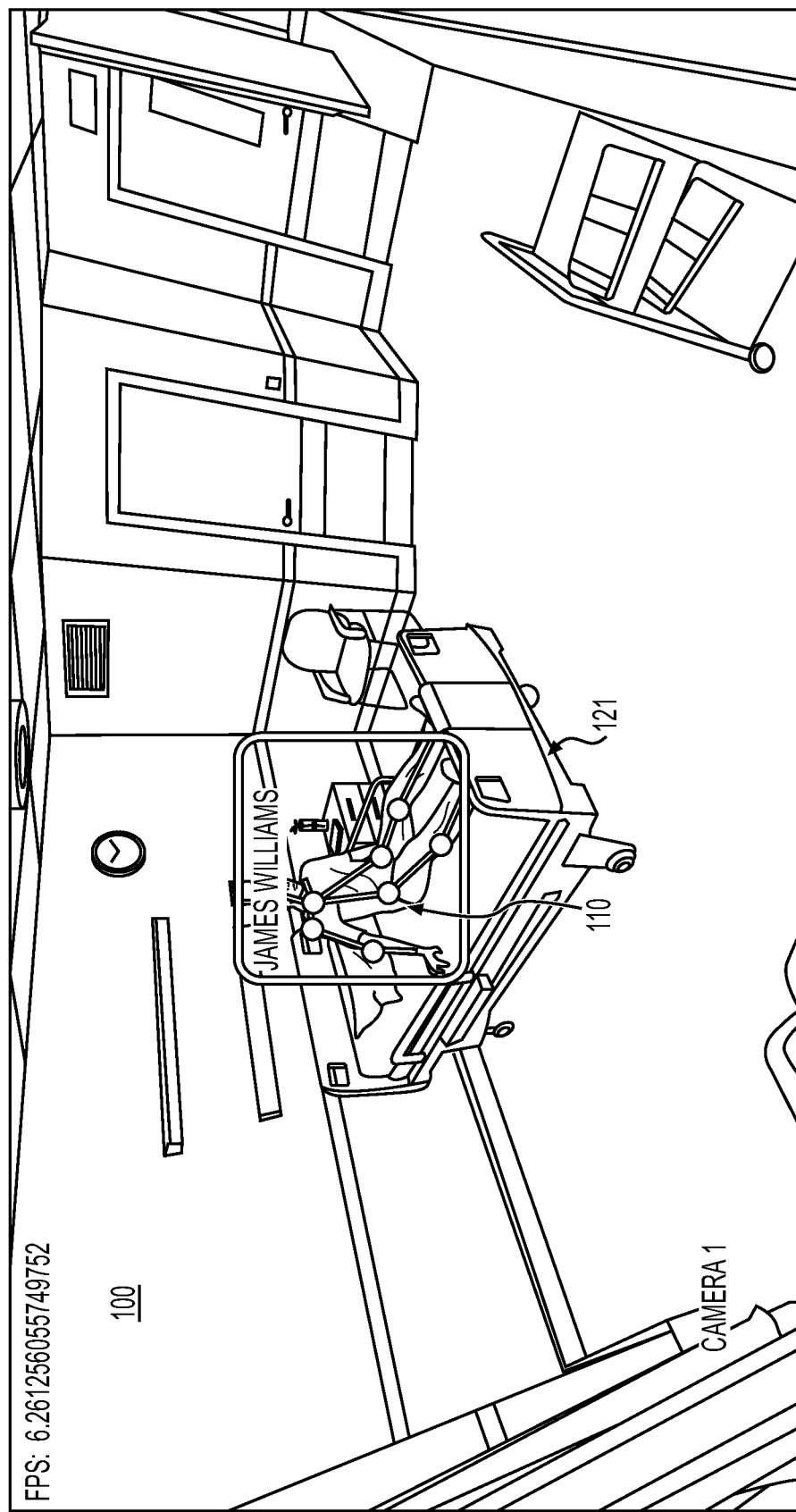
Figure 11:
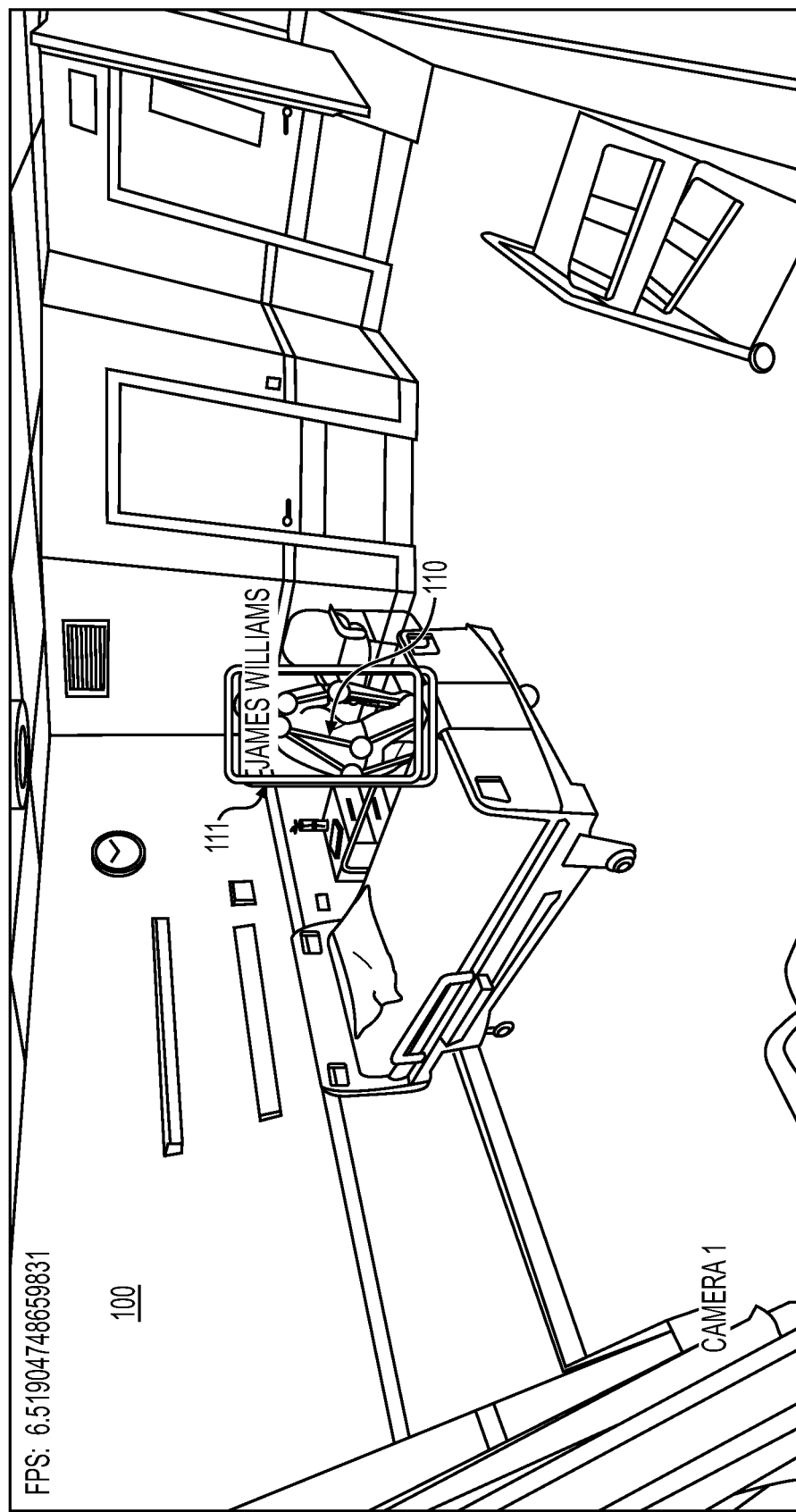
Figure 12:
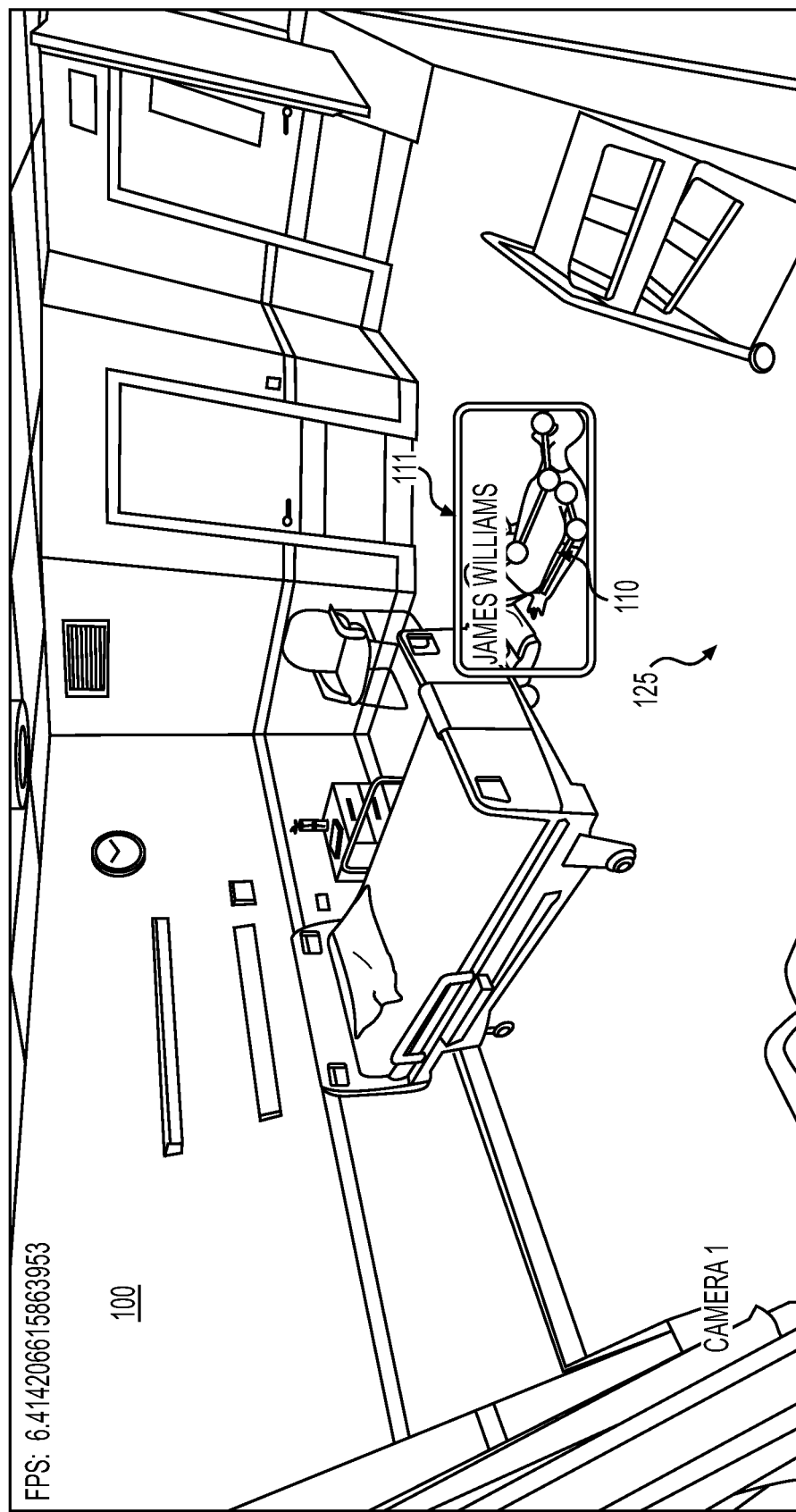

FIG. 10 shows our vulnerable person 110 as James Williams, his identity determined by application of facial recognition algorithm 317. FIG. 10 also shows Mr. Williams sitting further up in bed 121. FIG. 11 shows Mr. Williams as out of bed 121, standing on floor 125, and hunched over. FIG. 12 shows Mr. Williams lying on floor 125.

Figure 13:
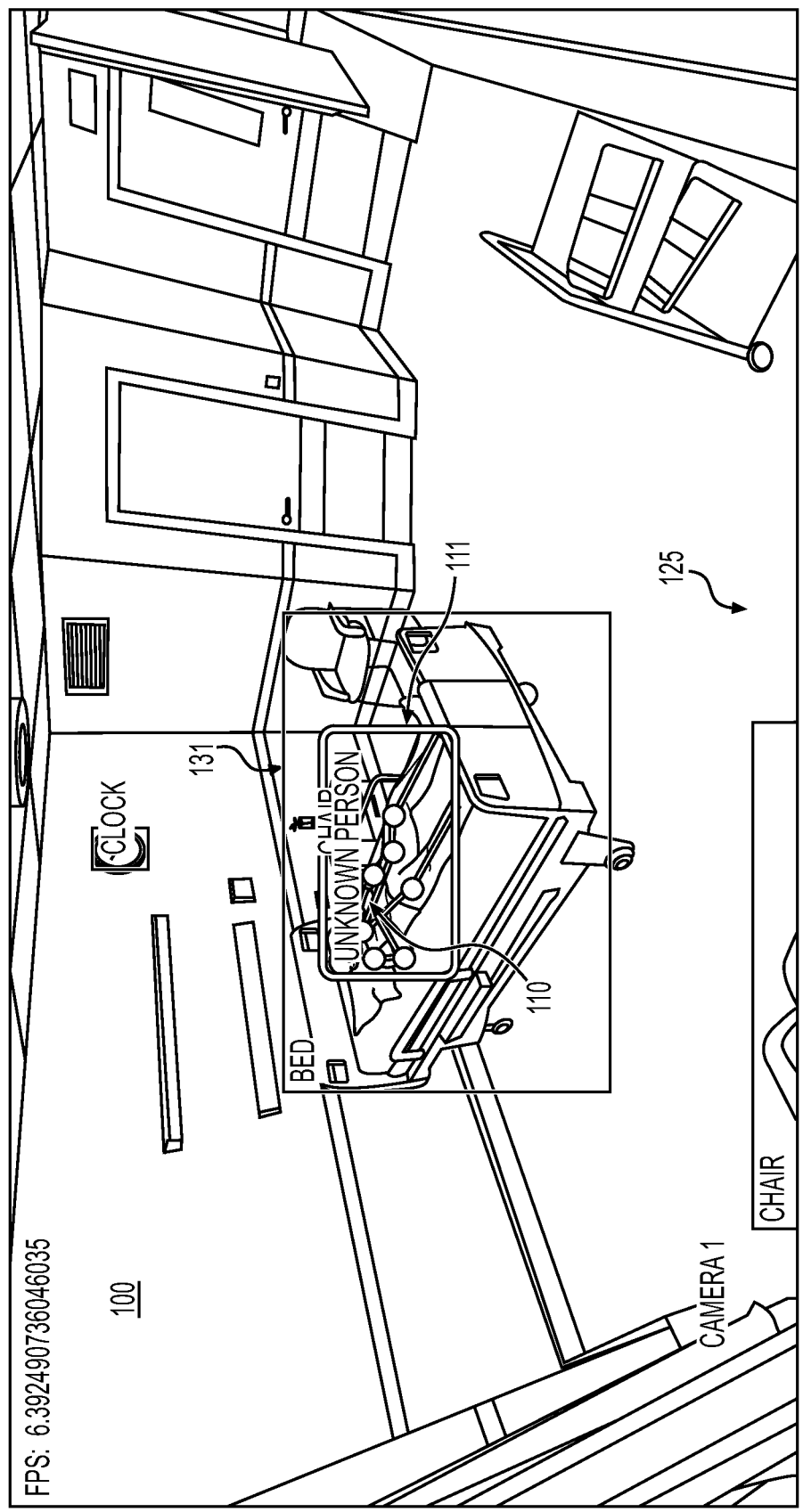
FIGS. 13-16 represent contextualized and analyzed video frames captured by the video monitoring system during an event occurring in the example environment of FIG. 1.
Figure 14:
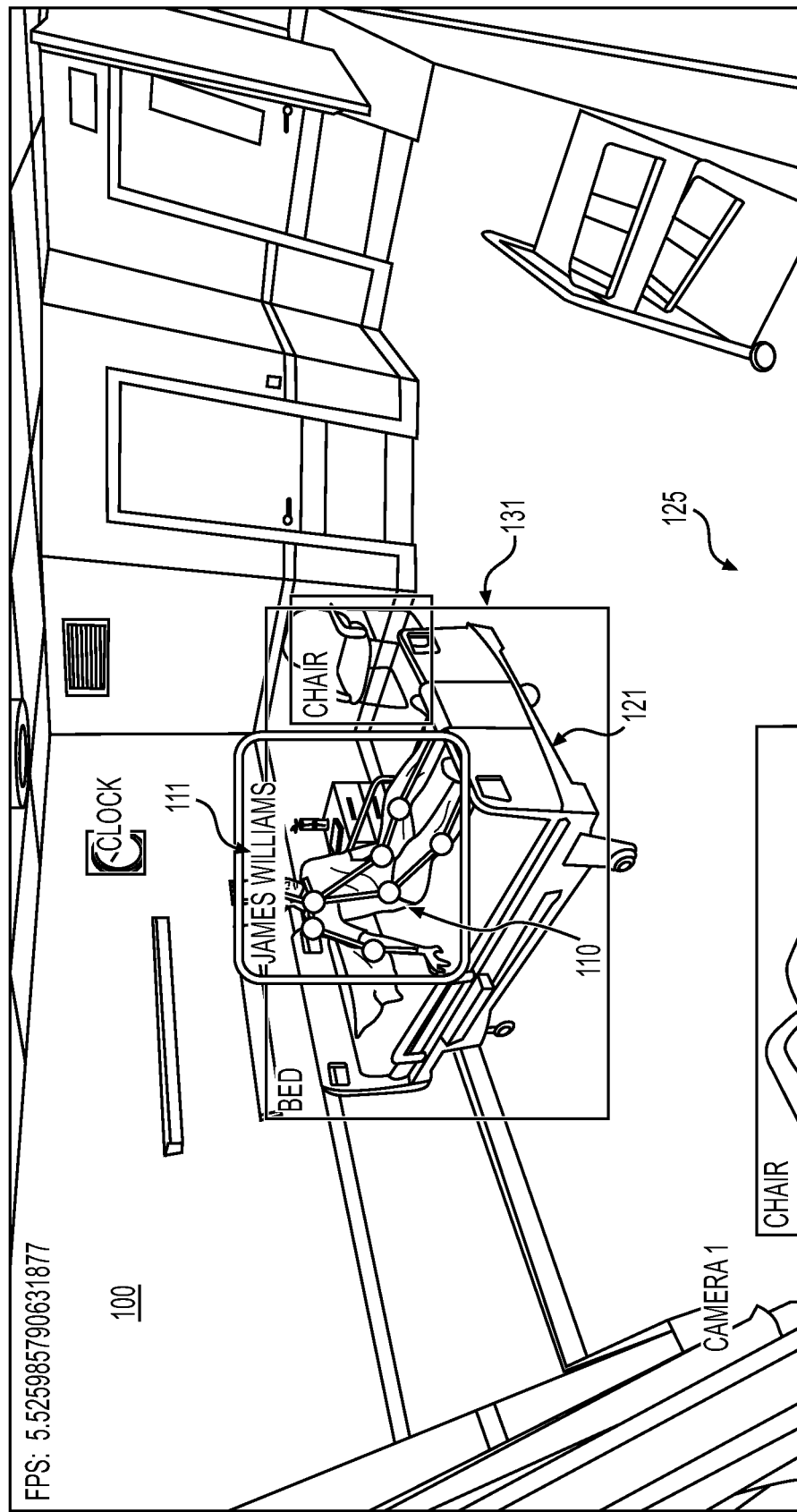
Figure 15:
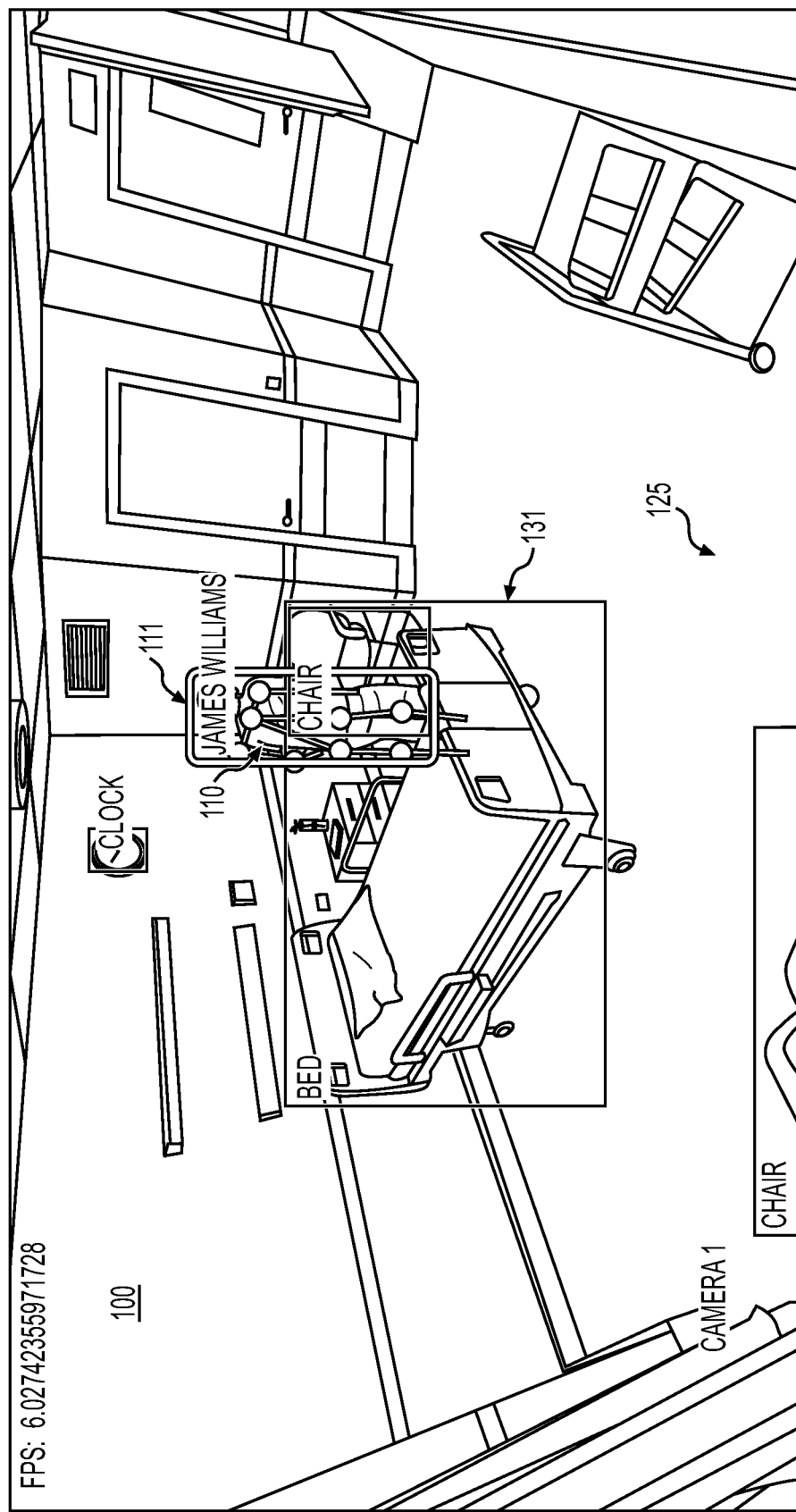
Figure 16:
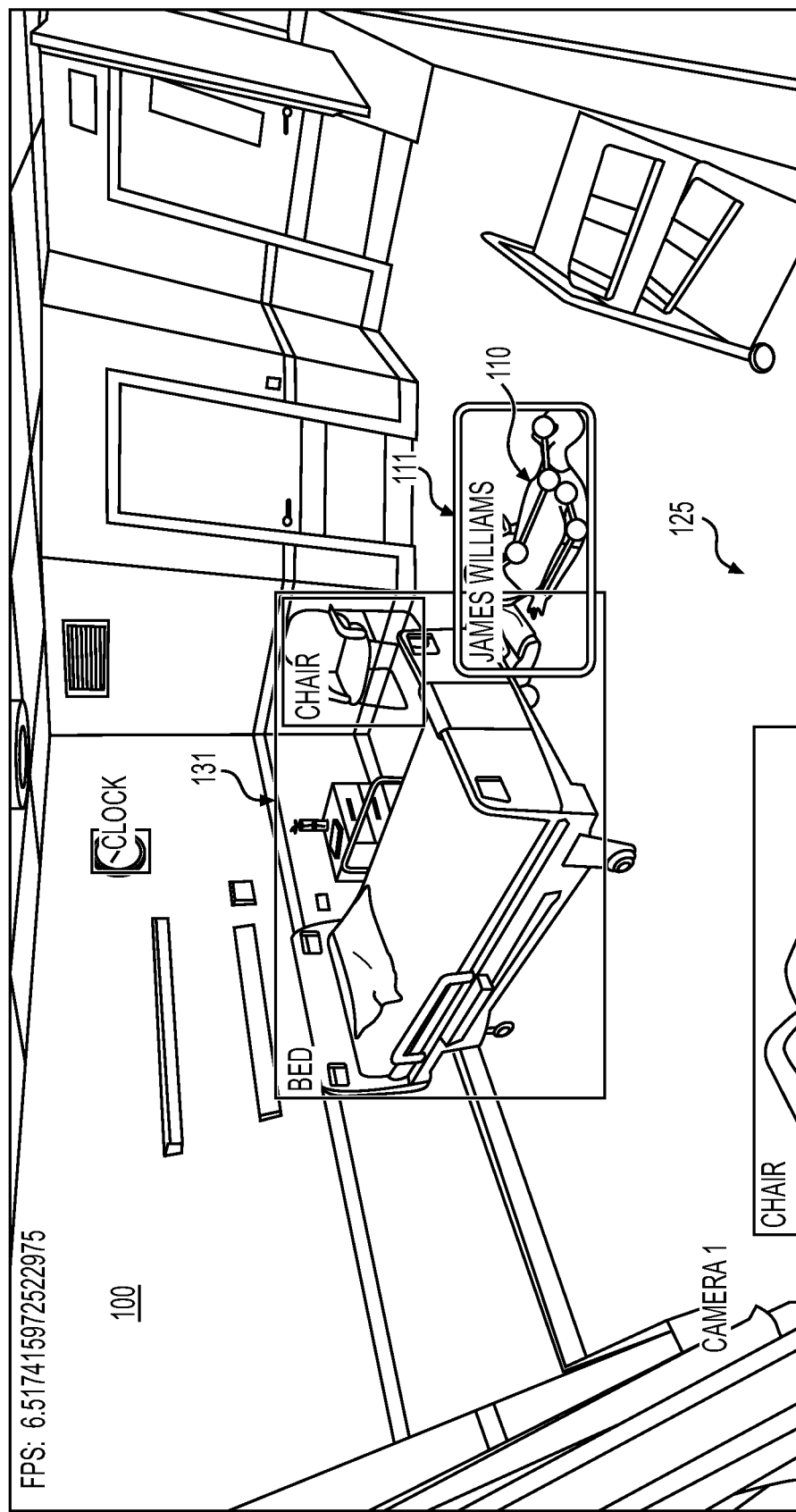

FIGS. 13-16 represent contextualized and analyzed video frames captured by the video monitoring system 200 during an event occurring in the example environment 100 of FIG. 1. FIGS. 13 and 14 show Mr. Williams in bed 121, transitioning from a lying to a sitting posture. FIG. 15 shows Mr. Williams standing by a side of bed 121. FIG. 16 shows Mr. Williams lying on floor 125. Posture and context analysis of video frames including and between those shown in FIGS. 15 and 16 would provide sufficient information to show that Mr. Williams fell. For example, posture recognition algorithm 322 and motion algorithm 324 would show Mr. Williams moving to the floor 125 with a velocity indicative of falling.

Figure 17A:
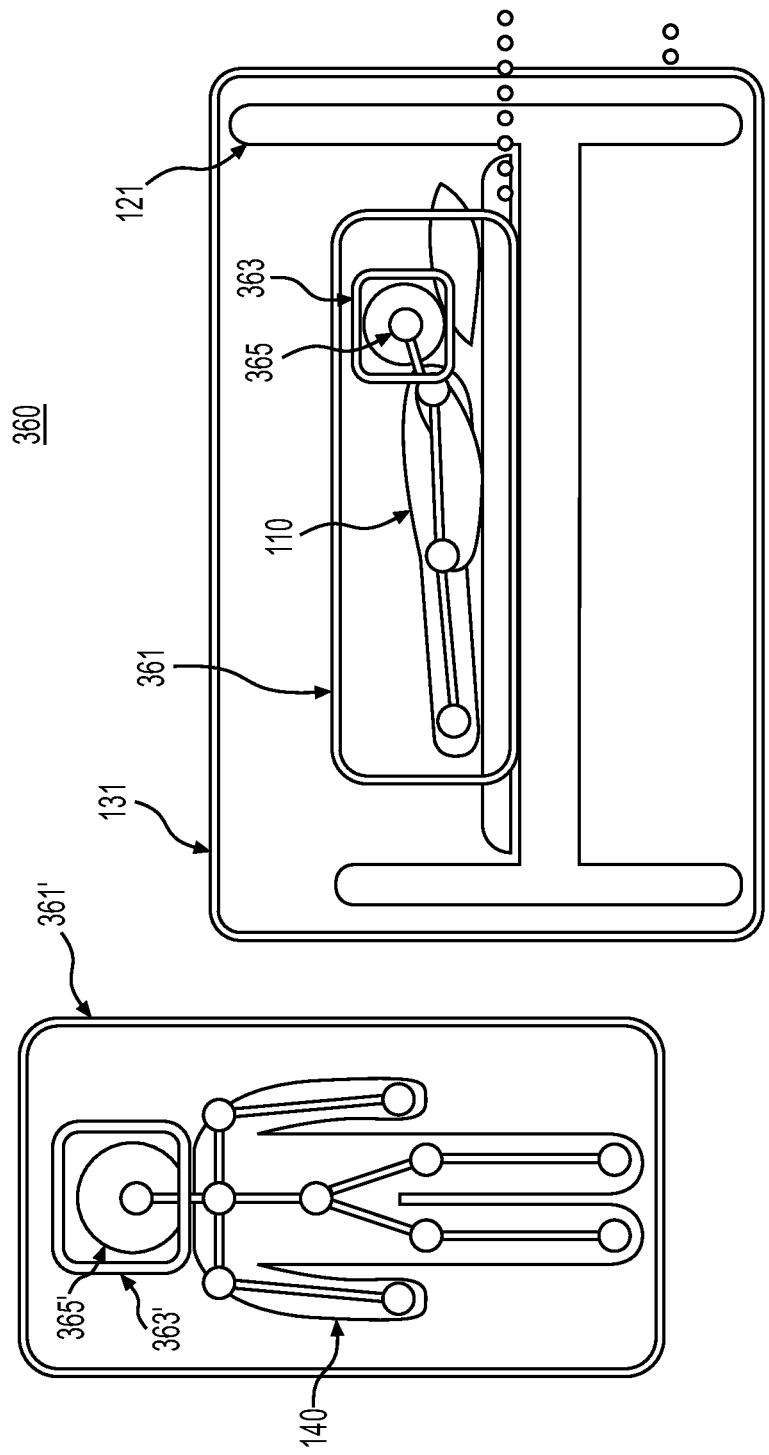
FIGS. 17A and 17B illustrate aspects of the analysis and contextualization operations executed by the video monitoring system of FIG. 2.
Figure 17B:
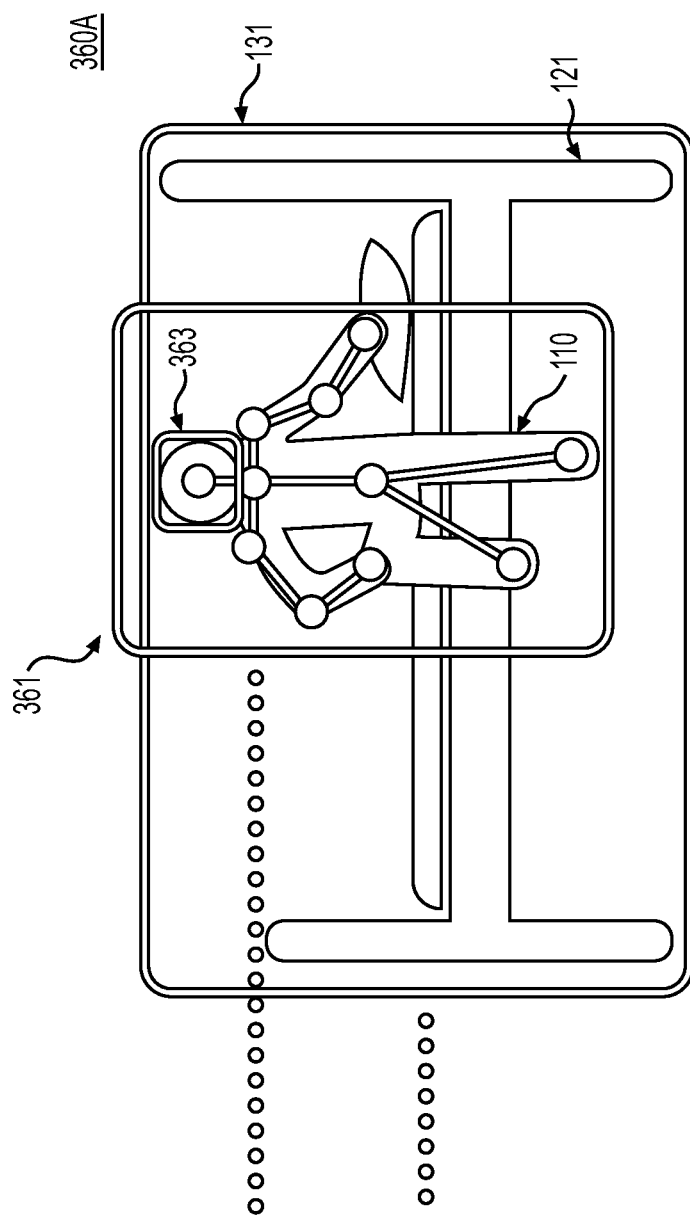

FIGS. 17A and 17B illustrate aspects of the analysis and contextualization operations executed by the video monitoring system. FIG. 17A illustrates a scenario that may be observed in the environment 100 of FIG. 1, and FIG. 17A represent a simplified video frame 360 captured by video camera 210 and passed to processor system 220. In this video frame, caregiver 140 can be seen to have entered the hospital room occupied by James Williams, our vulnerable person 110. Mr. Williams is seen lying in his bed 121. Caregiver 140 is standing. Referring to FIG. 18, Mr. Williams is noted to be at risk from falling and pressure ulcers, and precautions are in order for fall detection, fall prevention (forecasting a possible fall event) and pressure ulcers. A more expansive view of Mr. Williams' medical status can be seen in FIG. 19, which notes Mr. Williams may get out of bed on his own (an increase in risk of falling) in the early morning.

Figure 19:
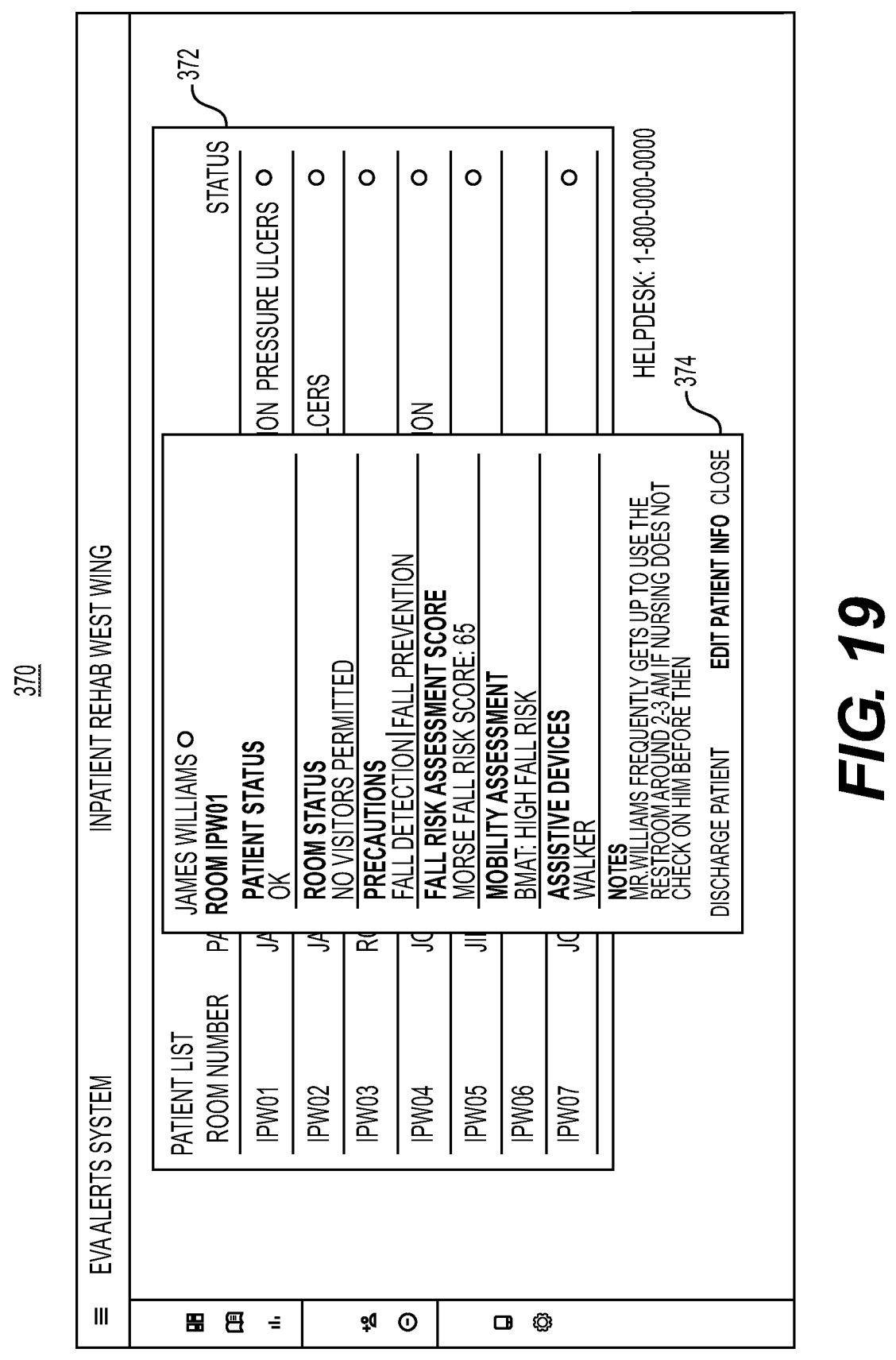

Returning to FIG. 17A, Mr. Williams 110 is recognized by execution of trained facial recognition algorithm 317. In an aspect of tis execution, the algorithm 317 may construct bounding box 363 in the recognized head region of Mr. Williams 110 and apply facial recognition features 365 to the image captured of Mr. Williams. Mr. Williams' posture (lying) is determined by posture recognition algorithm 322 of FIG. 3 to positively identify Mr. Williams' status. Similarly, the algorithm 317 constructs bounding box 363' and applies facial recognition features 365' to positively identify caregiver 140. Caregiver 140 also is encompassed by bounding box 361'. Caregiver 140 will subsequently be determined to be an authorized caregiver and thus is allowed in Mr. Williams' room. Since caregiver 140 is authorized, his presence in Mr. Williams' room does not create an event. Were caregiver 140 not authorized, or were the person not recognized, the processor system 220 could generate an unauthorized visitor event, which would be provided to caregivers and observers responsible for Mr. Williams' safety, security, and well-being. Since Mr. Williams is lying in bed 121, and the precautions listed in the chart shown in FIG. 19 are fall detection and fall precaution, Mr. Williams' posture does not constitute either a fall event or the prospect of a fall event.

FIG. 17B illustrates another scenario involving Mr. Williams, who can be seen in the simplified video frame 360A alone in his room. Bounding boxes 361 and 363 show that Mr. Williams 110 is sitting in bed 121, which puts him at risk of falling were he to stand up. The processor system 220 would execute to generate a fall prevention alert and provide the alert to caregiver 140 (FIG. 17A), who may be able to enter the room in time to assist Mr. Williams and so prevent a fall.

FIGS. 18-20 illustrate example information displays generated by the video monitoring system 200. FIG. 18 displays alerts system report 370 including alerts status 372. The alerts status 372 indicates the alerts that may be generated/expected for Mr. Williams. FIG. 19 illustrates report 370, but with an overlay of specific status report 374 for Mr. Williams. FIG. 20 illustrates report 370 with the addition of an alert resolution banner 376. These reports may be generated by the processor system 220 of FIG. 2 and may be displayed to caregivers/caretakers such as caregiver 140 of FIG. 17A.

Figure 21:
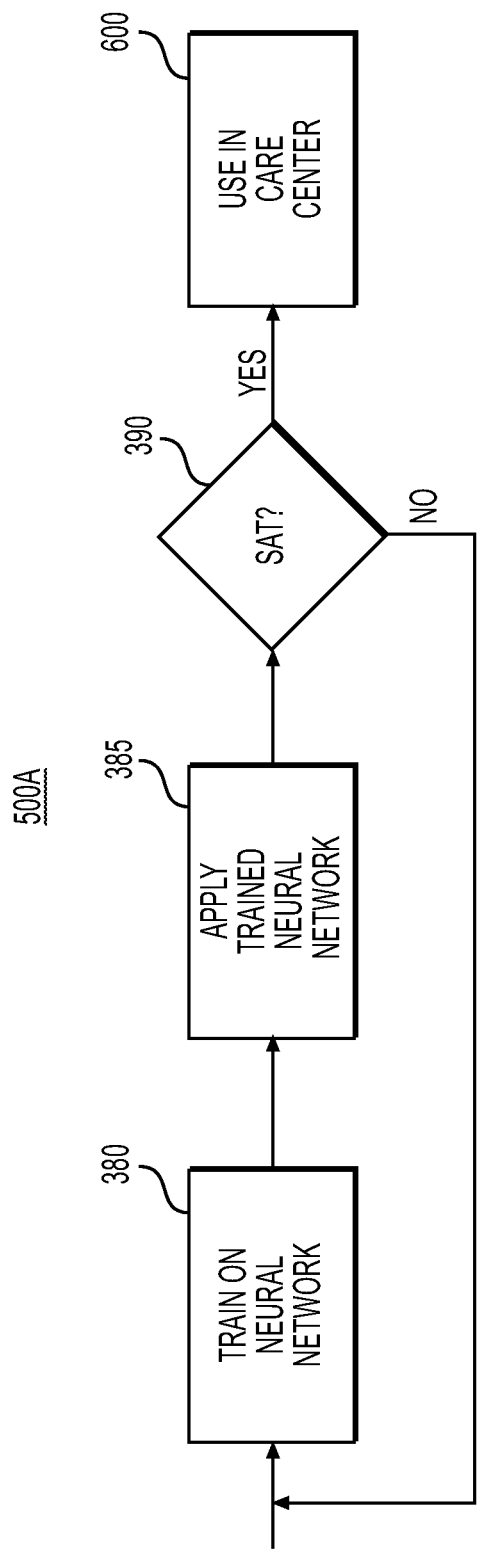
FIGS. 21-22 are flowcharts illustrating example operations of the video monitoring system of FIG. 2.

FIGS. 21, 22, and 24-26 are flowcharts illustrating example operations of the video monitoring system 200 upon execution of various algorithms disclosed herein. The descriptions of the flowcharts also refer to the environment 100 shown in FIG. 1, the system and components shown in FIGS. 2 and 3 and the environments illustrated in FIGS. 5-17B. The operations of the flowcharts illustrated in FIGS. 22 and 24-26 begin with calibrated cameras 210, trained algorithms, and possibly known image objection location data, and other data, stored with processor system 220. FIG. 21 illustrates an example operation for training the algorithms used in the video monitoring system 200. In FIG. 21, example operation 500A begins in block 380 with training a processor/algorithm using a convolutional neural network, or similar neural network to recognize objects in an image frame (i.e., a raw image derived from the frame); to segment the image frame so as to identify, for example, floors, walls, and other relevant structures visible to a camera 210; to classify the detected objects as to type (e.g., person, non-person, furniture, door, etc.); identify postures of person image objects; correctly relate detected objects to segments; and to track detected objects, frame-to-frame, among other functions. In block 385, the trained processor/algorithm is applied to a test frame, or frames having known objects and segments, to verify proper and satisfactory operation. In block 390, operation of the processor/algorithm is determined to be satisfactory or not satisfactory, according to a predefined metric. If the processor/algorithm perform in a manner deemed satisfactory, the operation 500A proceeds to operation 600, and the algorithm may be used in real-world settings such as the environment 100 of FIG. 1. Otherwise, the operation 500A returns to block 380, and further training may be attempted.

Figure 22:
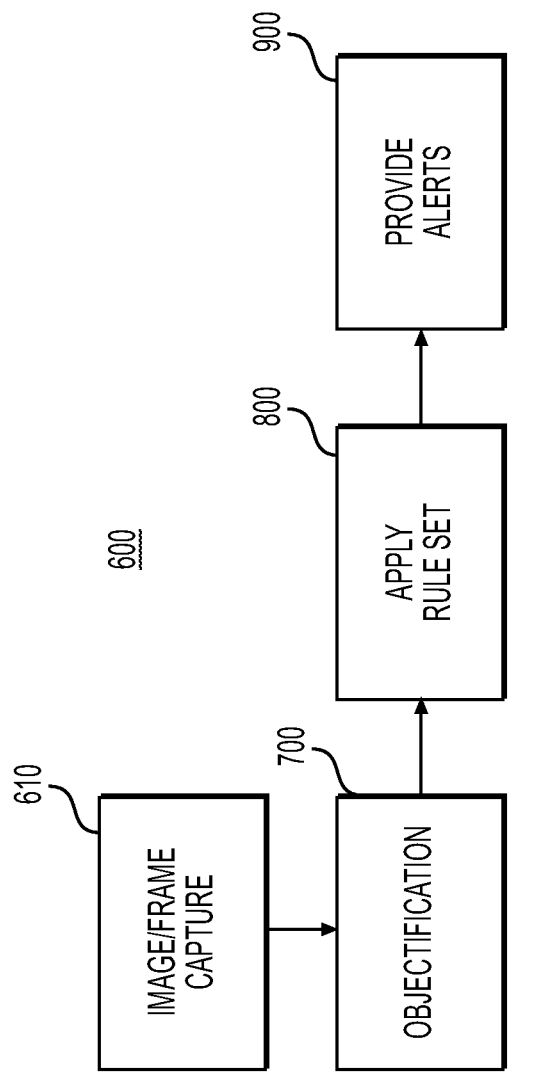
Figure 25:
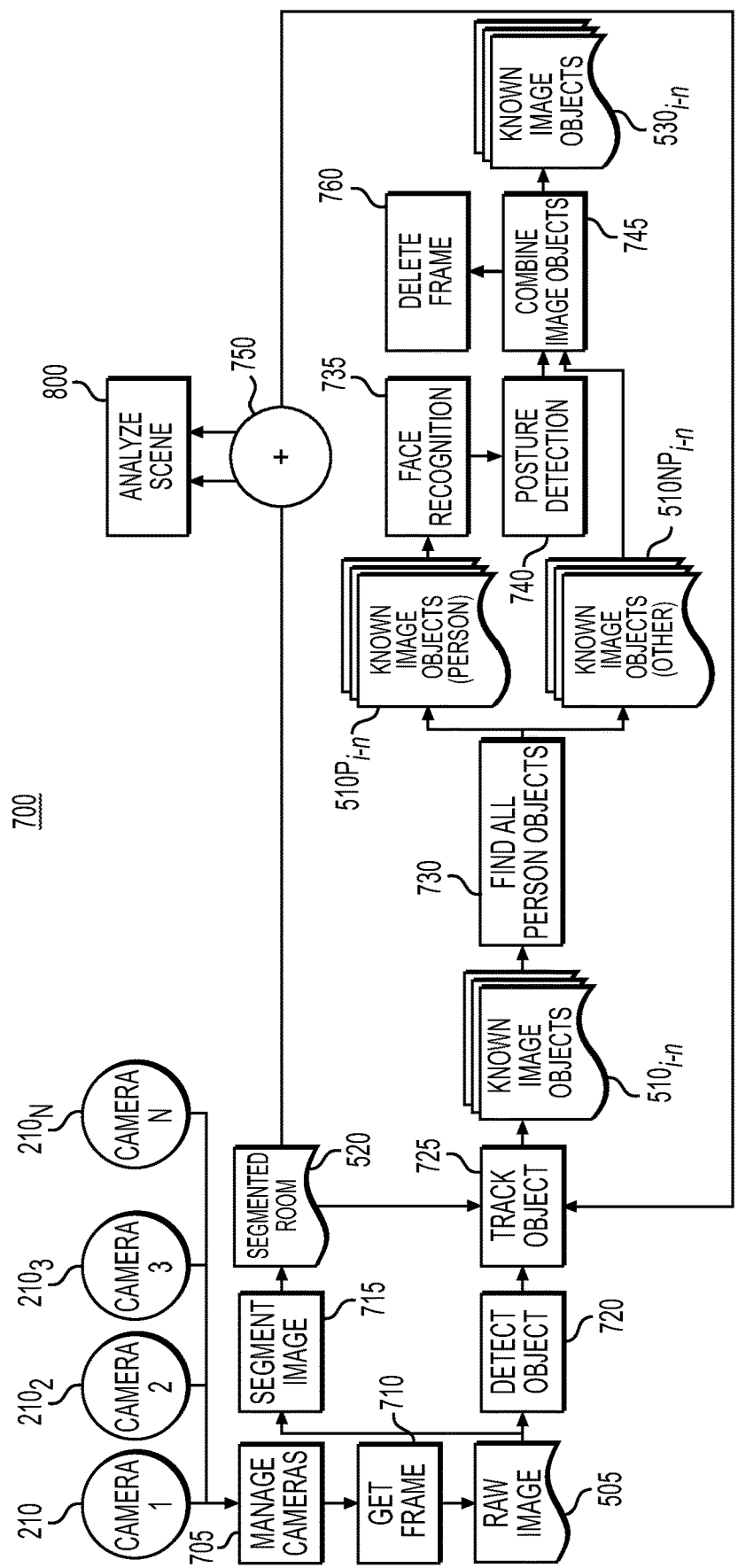

FIG. 22 is a high level view of example operation 600, which may be employed in the environment 100 of FIG. 1 to predict and detect untoward events related to individuals in the environment 100 and to provide alerts as appropriated based on the predictions and detections. Operation 600 begins in block 610 with a frame/image capture operation. Referring to FIGS. 1-3, the operation of block 610 may include a camera manager (a component of processor system 220) directing camera 210 in environment 100 to send one or more frames to processor system 220, where the frame may be processed using the components shown in FIG. 3. Alternately, or in addition, camera 210 may send frames to processor system 220 automatically, based on, for example, detected movement of a person image object in the environment, and/or, periodically, such as every 15 minutes, for example. Following frame/image capture, operation 600 moves to operation 700, and the processor system 220 executes a number of image object analyzes, or image objectification. The output of operation 700, which is shown in more detail in FIG. 25, is a final set of known image objects $530_{i-n}$. In operation 800, a rule set is applied to the final set of known image objects $530_{i-n}$ in order to provide predictions of events and detection of events. The operation 800 is shown in more detail in FIG. 26. Following block 800, operation 600 moves to operation 900, and in block 910, if an event is sufficient to trigger an alert, the video monitoring system 200 provides alerts, block 920, as appropriate, to personnel responsible for the well-being of the individual(s) in environment 100. The operation 600 then repeats, blocks 610-920.

Figure 23:
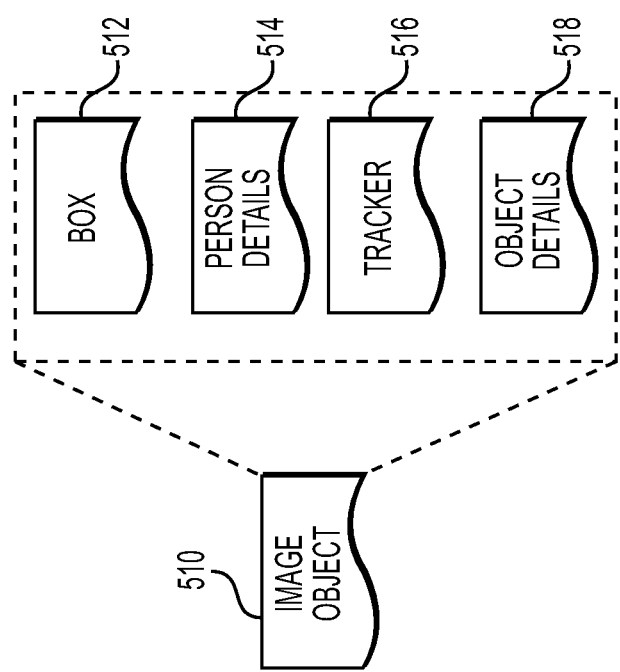
FIG. 23 illustrates and example image object.

FIG. 23 illustrates example preliminary image object 510 in a preliminary set of known image objects $510_{i-n}$ derived from a frame. Example preliminary image object 510 in the preliminary set of known image objects $510_{i-n}$ may be a person image object or a non-person image object. Preliminary image object 510 is not, however, related to any specific image segment. Image segmentation and relation of preliminary image objects 510 to image segments is disclosed herein. Preliminary image object 510 may be seen to include box 512 (i.e., a bounding box). Box 512, once determined, may be fixed in relation to the object that box 512 bounds, except that when the perceived dimensions/orientations of the bounded image change, the box 512 may change dimensions/orientation. For example, if a person image object moves from a sitting to a standing position, corresponding box 512 may change to reflect the movement. Once box 512 is established, the processor system 220 may assign a confidence level to the box 512. The confidence level reflects the processor system's estimate as to the reliability of the bounded preliminary image object 510, including its classification (person, non-person, specific person, posture, etc.) and the correctness of the boundary represented by the box 512. In an aspect, preliminary image objects 510 that cannot be bounded within a predetermined confidence level may be deleted from the preliminary set of image objects $510_{i-n}$. Thus, a preliminary image object 510 is a known image object. A preliminary image object 510 that is a person image object may include person details 514. Person details 514 are disclosed in more detail herein, including with respect to FIG. 24. Next, a preliminary image object 510 includes tracker 516. Tracker 516 is a feature that allows the processor system 220 to follow an image object from frame to frame. Finally, a preliminary image object 510 includes object details 518. Thus, a preliminary image object 510 contains and/or describes features and characteristics of an object in a frame (the bounding box, object classification, person details, including the person's pose or posture, object tracking information, and a history of the bounding box (e.g., its location, shape, size, orientation). These features and characteristics enable the processor system 220 to follow image objects through sequences of frames (i.e., as time continues) and to access information about a specific image object; for example, if the image object is a person image object, the person's name and pose. Thus, image object tracking may be employed to match known image objects with new, recently identified image objects in a current frame being analyzed. A recently identified image object that can be matched to an existing object may be added to the preliminary set of known image objects $510_{i-n}$, or to a final set of image objects (see FIG. 25). Any known image objects that no longer are identified by the image object detection process may be moved a "lost" status, where a last known position of an image object may be stored. A "lost" image object may be restored if the "lost" image object later is reidentified by the processor system 220; for example, if a "lost" person image object is identified in a later frame of a camera feed, the person image object, and its associated person details 514 may be restored in an earlier frame.

Figure 24:
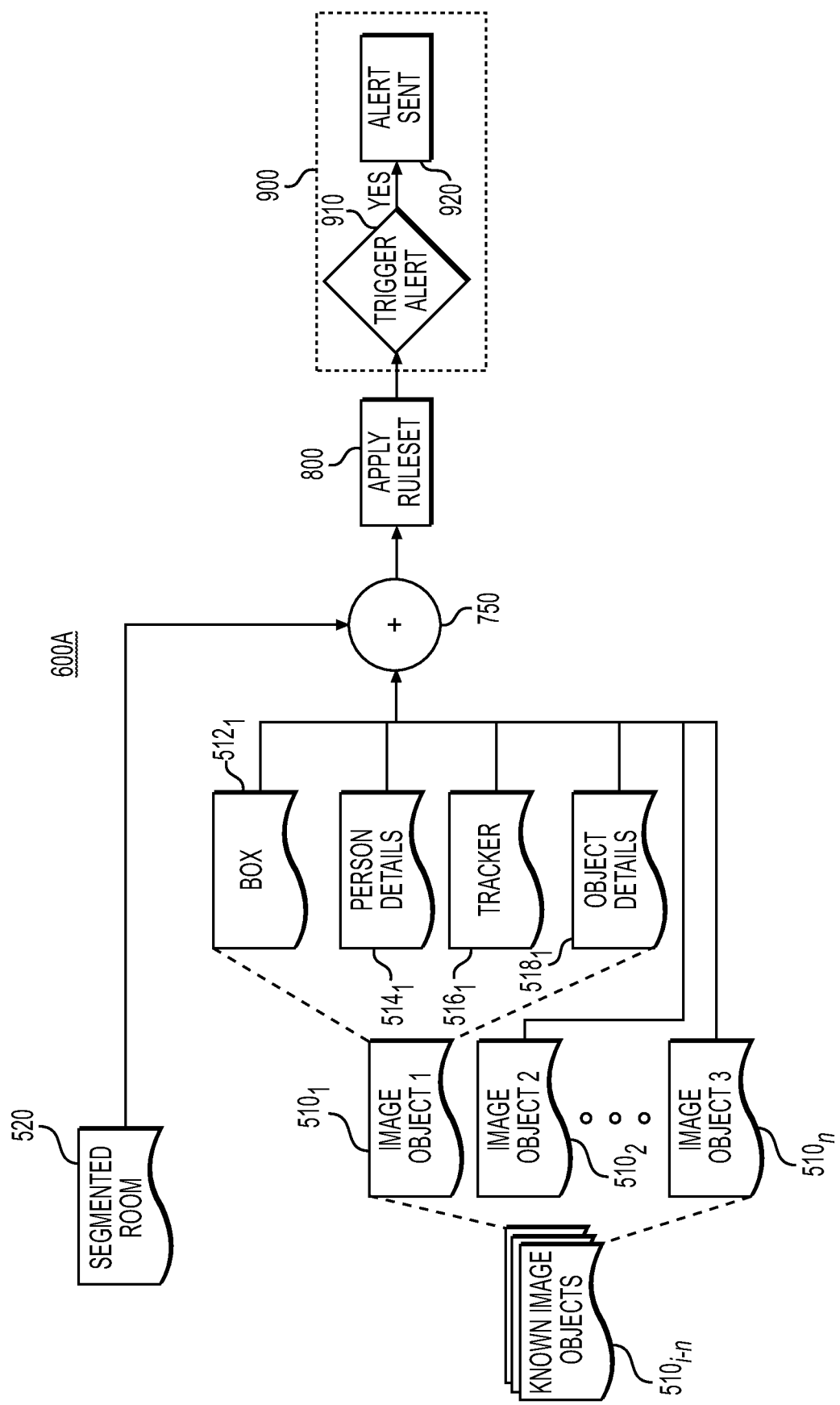
FIGS. 24-26 are flowcharts illustrating additional example operations of the video monitoring system of FIG. 2.

FIG. 24 illustrates a more detailed version of aspects of operation 600 of FIG. 22. In FIG. 24, and referring to the example environment, system and components of FIGS. 1-3, respectively, operation 600A includes a merge operation (block 750), an apply rule set operation 800, followed by an alert operation 900. As before with operation 600, to produce a set of known image objects (as shown in FIG. 24, preliminary set of image objects $510_{i-n}$) operation 600A begins with one or more video cameras 210 installed in room 100 transmitting video data to processor system 220. For example, processor system 220 receives, and, as necessary, preprocesses the video data (e.g., decrypting if encrypted, interpolating if decimated or compressed) received from the one or more video cameras 210. Use of multiple cameras in a single room 100 such as shown in FIG. 1 allows for a greater field of view and improved accuracy of event detection. The use of multiple cameras in multiple rooms allows for the application of the system to a larger area. Following pre-processing, the processor system 220 pulls individual video frames from video footage captured by the video camera(s) 210 to analyze video frames for multiple parameters. Next, the processor system 220 executes objection recognition algorithm 312 to first, detect discrete objects in the room 100, second, identify discrete detected objects, and third to determine locations of the identified objects in the room 100. Next, the processor system 220 executes object tracking algorithm 314 to follow identified image objects. The object tracking algorithm 314 may combine information from a history of known image object locations within room 100 and may compute how an image object moves between video frames. Object tracking provides information about image objects in the video frame, and how the image objects have moved (as appropriate). These data may be time-stamped (with, for example, the time registered for the video frame), annotated with camera identification, and saved, referenced by "objects in scene." Then, processor system 220 determines if one or more image objects present in the room 100 is a person image object. If no identified image object in the room 100 is a person, the operation 600A may retrieve another video frame.

If one or more of the identified objects is determined to be a person image object, the processor system 220 executes trained facial recognition algorithm 317 to identify the person image object. To identify the person image object, the algorithm 317 may uses a pre-existing database of facial identities. For example, in the room (environment) 100, Mr. Williams' face may be registered in the pre-existing database of facial identities. Additionally, caregivers such as caregiver 140 of FIG. 17A, may have their faces registered in the pre-existing database of facial identities. If the person image object's face matches one of the facial identities in the database, the person image object is identified. If the face of the person image object does not match one of the identities in the facial identities database, or the person image object is not facing the camera 210, the person image object may be designated as an unknown person image object. Then, the person's identity, known or unknown, may be attached to the person image objects, and stored, referenced by "persons in scene," and the "persons in scene" data. Following this operation, the processor system 220 may execute posture recognition algorithm 322 to identify and track the postures of a person identified by facial recognition as well as an unidentified person in environment 100. The algorithm 322 analyzes the position of joints and anatomical landmarks in relation to each other to determine the posture of the person. Since the operation already has established the location of persons (known or unknown) in environment 100, the algorithm 322 may apply postural analysis to the portion of the video frame (raw video image) containing the person, allowing for a reduction in overall computation. To effectuate this reduction in computational load and to improve accuracy of results, the algorithm 322 may use only the data inscribed by a boundary box, such as those shown in FIGS. 17A and 17B, encompassing the person. The algorithm 322 compares the person's posture in the current video frame to their posture in previous video frames in order to compute how a person is moving. The person's posture and movements then may be saved (referenced by "person's posture") and provided for use in further operations of the processor system 220. Following image processing, the processor system 220 deletes the raw video frame in order to ensure the privacy of persons under observation by the video monitoring system 200. These steps may be repeated for subsequent video frames. Thus, the computed information about the identified objects, object movements, a person's posture, a person's identity, and a person's movement are saved with a frame number or time reference and with a camera identification for comparison with future video frames and for the generation of long-term metric tracking.

The processor system 220 may combine the information collected (the locations and movement of the objects, the person's identity, and the person's posture and movement) to make decisions about the scene by applying predetermined ruleset(s). For example, the combined data may show that there is one identified person, James Williams (who is a vulnerable person 110) in room 100 and that in the current video frame, Mr. Williams is sitting on an edge of his bed 121 with his feet on the floor after previously (in prior video frames) been lying down. Additional contextual information may be supplied such as, for example, time of day (e.g., 2 am) and that between 2 a.m. and 3 a.m., Mr. Williams routinely rises to use the restroom. These combined data may be subjected to one or more predetermined rulesets. A ruleset checks a set of predetermined conditions against the combined data, and if all conditions are met, or, alternately a subset of conditions is met an alert requirement may be triggered, and an alert may be generated and sent to the appropriate caregivers and/or observers. The alert may provide a specific textual description of the visual information captured by the video camera 210. The textual description allows for the preservation of critical information obtained visually, without a human observer to view captured video footage. The alert may be sent in multiple forms, including but not limited to a call, text, or push notification to a mobile device, an email, a pager, or a local alarm.

FIG. 25 is a flowchart illustrating example operation 700 of the video monitoring system 200. The example operation 700 is described with respect to room 100 (i.e., health care environment, see, e.g., FIGS. 1 and 14) and video monitoring system 200 and components 300 (see FIGS. 2 and 3, respectively). Operation 700 is executed to produce a final set of known image objects (set 530$i$-$n$) that may be used, in combination, with image segments, to determine the status of a given individual, predict a behavior or threat to the individual (in the example, Mr. Williams 110), and provide alerts, as appropriate. For example, operation 700 may be executed to predict a possible fall by Mr. Williams 110, and to detect a fall, should one occur. A video camera $210_1$ placed in Mr. William's room 100 operates with a view of bed 121. The video camera $210_1$ captures video footage (frames) of Mr. Williams in the room 100, from which image objects may be derived. The image objects may include person image objects and non-person image objects. In an example, non-person image objects are inanimate objects. In other examples, non-person image objects may be of other living objects (i.e., animals). Operation 700 begins, block 705, with components of the video monitoring system 200 managing (e.g., communicating with) cameras $210_1$-$210_n$ to get a frame, which results in (provides or generates, block 710) raw image 505. In the example operation 700, camera $210_1$ is in operation in room 100. Raw image 505 then is processed through two paths, a segmentation path and. an object detection path. In block 715, the video monitoring system 200 and components 300 process the raw image 505 to generate one or more image segments. For example, raw image 505 may be segmented, block 715, to generate a first segment representing floor 125 of room 100 and one or more additional segments representing walls of room 100 that are in view of camera $210_1$. As disclosed herein, the image segmentation of block 715 may be executed using a mask or a trained neural network, for example. The output of block 715 is segmented room 520. In block 720, the video monitoring system 200 and components 300 process the raw image 505 to detect objects therein and optionally, to classify the detected objects. Detecting (and classifying) image objects in the raw image 505 allows the processor system 220 to apply bounding boxes, such as the box 131 for bed 121; see FIG. 14. Optionally in block 720, the processor system 220 computes a confidence level that indicates the assigned box accurately encloses the image object within the bounding box (e.g., the confidence level associated with box 512 of FIG. 23). Any confidence level below a configurable threshold may result in the processor system 220 removing the detected image object from a potential set of known image objects.

In block 725, the segmented room data 520 and the detected image objects are assigned a track feature or characteristic (e.g., tracker 516 of FIG. 23). The tracker feature enables the processor system 220 to track image objects as well as segments through sequences of frames (i.e., as time continues) and to access information about a specific image object; for example, if the image object is a person image object, the person's name and posture. Thus, image object tracking may be employed to match known image objects with the new, recently identified image objects. A recently identified image object that can be matched to an existing (known) image object may be added to a set of known image objects. The output of block 725 is a preliminary set of image objects $510_{i-n}$. Any known image objects that no longer are identified by the image object detection process may be moved a "lost" status, where a last known position of an image object may be stored. A "lost" image object may be restored if the "lost" image object later is reidentified by the processor system 220; for example, if a "lost" person image object is identified in a later frame of a camera feed, the person image object, and its associated person details 514 may be restored in an earlier frame.

Following block 725, operation 700 moves to block 730, and processor system 220 executes a number of algorithms (see, e.g., FIG. 3) to identify all person image objects, if not already done and to segregate all image objects into known person image objects $510_{i-n}$ and known other (non-person) image objects $510NP_{i-n}$. The known person image objects $510P_{i-n}$ are processed through facial recognition (block 735) and posture detection (block 740). In an aspect, using the bounding box from the person image objects, the raw image is cropped to only contain a raw image of that person. The cropped image then is passed into facial recognition, block 735, to identify the person. As part of block 735, once a person is identified, that information may be stored with the corresponding person image object. Next, the same raw image is passed to posture detection, block 740. The resultant posture is also is stored with the person image object as part of block 740. In an aspect, following blocks 735 and 740, if not already done, or to update the analysis, the processor system 220 computes (updates) a confidence level that indicates the assigned box and corresponding classification and identity of the person image object within the bounding box (e.g., the confidence level associated with box 512 and person details 514 of FIG. 23). Any confidence level below a configurable threshold may result in the processor system 220 removing the detected image object from a potential set of known image objects. However, in an aspect, person image objects that are classified as unknown may be retained. Following block 730 and 740, operation 700 moves to block 745 and all image objects are combined into a final set of known image objects $530_{i-n}$. Once the final set of image objects $530_{i\text{-}n}$ is generated, the final set $530_{i\text{-}n}$ is combined, block 750, with the room segments (segment room 520), and the image frame (obtained in block 710, and from which the final set $530_{i\text{-}n}$ was derived) is deleted, block 760. Thus, system 200 has no access to the raw image the frame has been deleted in block 760. The system 200 does, however, have access to the final set of known image objects $530_{i\text{-}n}$, which contains all the relevant image objects in the raw image, as well as their locations as those locations changed over the last x images, the image object classification, and if the know image object is a person image object, the person's name (possibly) and the person's pose or posture as that posture changed over the last x images. Using these data, the processor system 220 executes a series of checks, operation 800, to determine whether a person is/was sitting, standing, fallen, or needs/needed moving to prevent ulcers, or to detect/prevent/warn of other events related to the well-being of the person. If multiple persons are present, and if one person is identified by the processor system 220 as a caretaker, the processor system 220 may end or pause operation 700 with respect to the specific room 100 and person 110. However, the operation 700 may restart once the processor system 220 detects the presence of only the person 110 in room 100.

Figure 26:
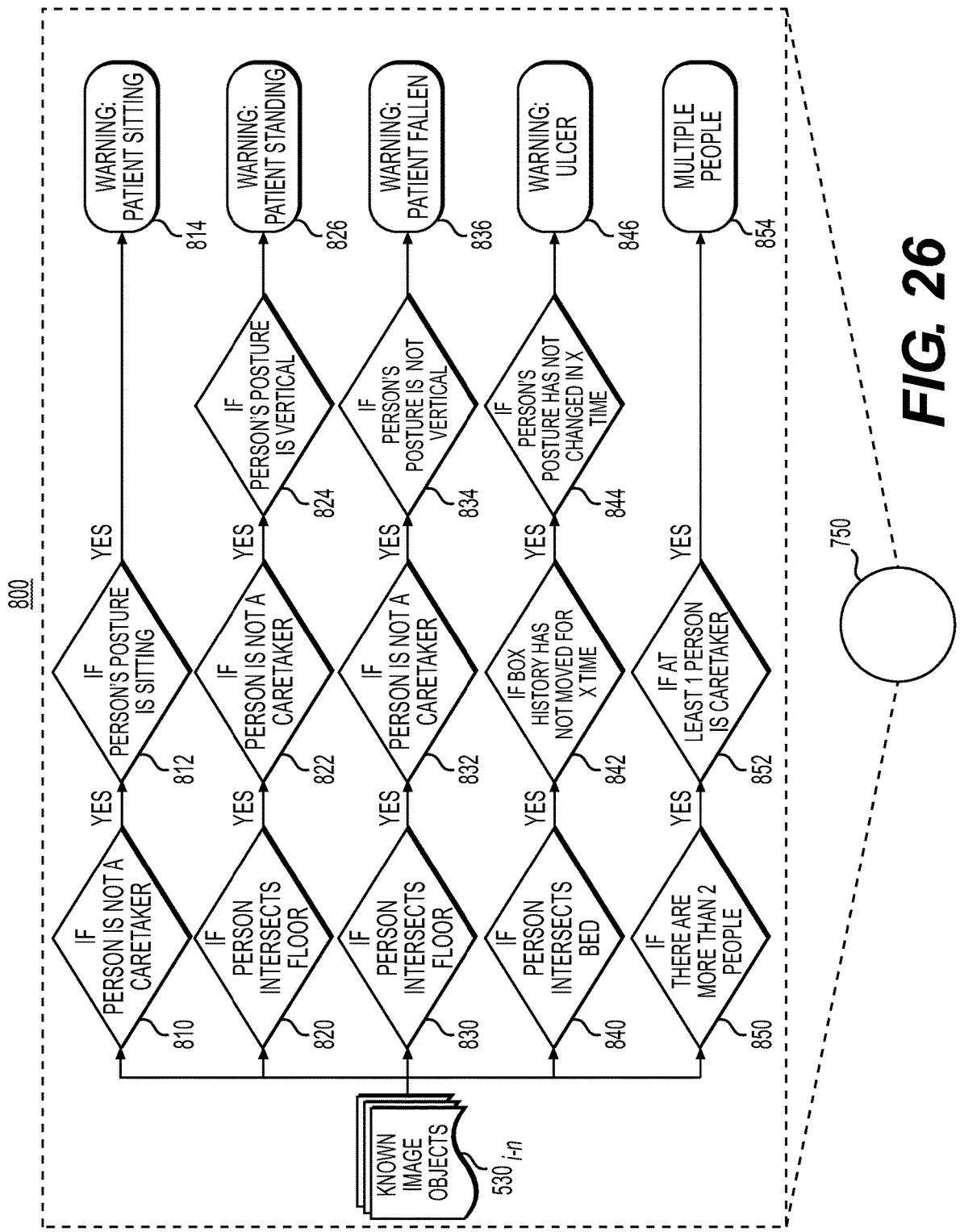

FIG. 26 illustrates an example of operation 800. In FIG. 26, operation 800 begins after generation of the data provided through operation of block 750 of FIG. 25, namely the segmented room data 520 and the final known image object set $530_{i\text{-}n}$. Operation 800 includes a series of process steps that in effect apply known rule sets to the data from block 750. Five series of process steps are illustrated; however, other rule sets also may be applied, and the five series of process steps are for illustration and are not limiting. The process steps all are shown with an implicit "YES" to continue. Failure to satisfy ("YES") the stated condition is an implicit "NO," which terminates the current series of process steps and results in selection of the next sequential series of process steps. The operation 800 may execute until all five series of process steps reach an implicit "NO" or reach a final step in the series. Turning first to execution of process block 810, the processor system 220 determines if the person image object is NOT a caregiver/caretaker (that is, is the person image object a patient such as Mr. Williams 110 or the person image object is unknown (not identifiable)). If the person image object is not a caregiver/caretaker or is not identifiable, the process continues to block 812, and the processor system 220 determines if the non-caregiver is sitting. Determination of sitting may use the posture of the person image object as well as other person image object details; this determination also may use an appropriate relation between the person image object and any appropriate non-person image object such as chair 123. Note also that the person may be sitting in bed 121 or on the floor 125. See, e.g., FIG. 14. If the non-caregiver is sitting, the process continues to block 814, and the processor system 220 determines that an alert, patient sitting, should be provided. However, in block 810, if the person image object were determined to be a caregiver/caretaker, in an aspect, operation 800 may proceed to the process series beginning with block 850, skipping the intervening process series. Turning second to block 820 (noting again, that operation 800 may commence with block 820 rather than block 810), the processor system 220 determines if the person image object intersects the floor; that is, is some portion of the person image object in contact with the floor. If the person image object intersects the floor in block 820, the operation 800 moves to block 822 and the processor system 220 determines if the person image object is not a caretaker. If the person image object is not a caretaker ("YES" at block 822), the operation 800 moves to block 824, and the processor system 220 determines if the posture of the person image object (known patient or unknown person), the operation 800 process to block 826 to generate a patient standing warning. Similar processes are shown in process series beginning with blocks 830 and 840. In the process series beginning with block 850, the processor system 220 determines if there are two or more person-image objects detected in the frame. If two or more person-image objects are detected, operation 800 moves to block 852, and the processor determines if at least one of the person image objects is identifiable as a caretaker, such as the caretaker 140 of FIG. 17A. If at least one caretaker is identified, the processor system 220 may suspend retrieval and processing of image frames from camera 210 and may, block 854, provide a notification that room 100 include multiple persons.

The operations disclosed in the foregoing flowcharts may be used, for example, to detect a patient (i.e., our vulnerable person 110—James Williams) fall in the health care environment 100 of FIG. 1. A video camera 210 placed in Mr. William's room operates with a view of bed 121. The video camera 210 captures video footage (frames) of Mr. Williams in the room. The operations rely on data from derived from, or corresponding to "objects in a scene," "persons in a scene," and a "person's posture." Here, "scene," "frame," and "raw image" may be used interchangeably. Note that in FIG. 1, only one person, Mr. Williams, is "in the scene." However, in some scenarios, additional persons (doctors, nurses, etc.) could be "in the scene." Thus, processor system 220 may execute machine instructions to extract the "objects in a scene," which, referring again to FIG. 1, are bed 121, clock 122, chairs 123 and 124, and floor 125. The processor system 220 also determines person identities (known, unknown, patient, caregiver/caretaker, Mr. Williams) from the "persons in a scene." Note, however, that the video monitoring system 200 may not be able to identify any person as Mr. Williams when in fact Mr. Williams is present in the room. This situation could arise if, for example, Mr. Williams' back was turned to the video camera 210 such that the processor system 220 could not successfully apply facial recognition processor 315 to Mr. Williams. As noted, in this scenario, operation 550 may simply end for the current video frame, and in subsequent video frames, Mr. Williams may present his face to the video camera 210. However, Mr. Williams may have fallen, and may be dazed or unconscious, and subsequent frames may not show his face. Of course, this non-recognition scenario may be addressed by using multiple video cameras. Alternately, the components of processor system 220 may infer the unrecognized, and hence unknown, person is Mr. Williams by use of location data for Mr. Williams from prior video frames. In particular, once a person in a scene is identified as Mr. Williams, the processor system may use motion algorithm 324 to confirm Mr. Williams' identity in subsequent video frames. Next, the processor system 220 extracts frame-to-frame motion from the "person's posture." Assume that the data shows Mr. Williams horizontal and lying down. Furthermore, assume contextual analysis show Mr. Williams lying on floor 125. The processor system 220 discards the current video frame and then uses Mr. William's posture, his movements, and his relation to objects in the room to detect if a fall occurred. For example, to detect if a person has fallen, processor system 220 may first check if the image objects bounding box intersects the floor from the segmented image. Then the processor system 220 may check if that person is not a caretaker using the person details that were saved from the facial recognition, finally, we can pass the person's posture through a neural network which gives a Boolean value on whether the person has fallen or not. Thus, after discarding a current video frame, the processor system 220 compares the computed information for the current frame to computed information from previous video frames. The previous video frame information shows that Mr. Williams was standing and that the he transitioned from standing position to lying down at a velocity and acceleration greater than the predetermined threshold for falling. Thus, the operation executed by processor system 220 shows that Mr. Williams fell on the floor 125. The processor system 220 then applies rulesets for Mr. Williams and determines the conditions for falling have been met and that falling is one of the rulesets designated for Mr. Williams. The example discussed above detects the occurrence of a fall by Mr. Williams. However, the example may extend to a multitude of scenarios, some of which are clear from FIG. 26. For example, while the ruleset for falls discussed above describes a reactive alert to falls, a preemptive alert may be sent by modifying the ruleset. To illustrate, if a vulnerable person is determined by a caregiver to be a high fall risk, an additional ruleset may be set to generate an alert for getting out of bed unassisted. Once the processor system 220 determines the vulnerable person's posture transitioned from lying down in bed to sitting up to standing up, a preemptive alert may be sent to allow a caregiver to enter the room and assist the vulnerable person before the vulnerable person suffers from a fall.

Another example is the detection of a person having a generalized tonic-clonic seizure. The processor system 220 can detect the anatomical landmarks and joints of the person, compute the motion of the person's joints and anatomical landmarks, and compute the variance in motion. If the variance in motion exceeds a threshold, the processor system 220 can determine the person is having a seizure and can generate an alert to the designated caregiver.

Yet another example is the prevention of pressure ulcers. Pressure ulcers are a major concern to persons who are immobilized for extended periods of time. If a person maintains constant pressure on an area of the body for greater than two hours without a shift in weight, that area of the body does not receive adequate blood flow. The lack of blood flow causes death of tissues in that area of the body, which leads to a pressure ulcer. Prevention of pressure ulcers centers on the timely shifting of the immobilized person's weight to allow for the return of blood flow to areas that were previously under pressure from the person's body weight. The video monitoring system can be used to prevent pressure ulcers by generating alerts to designated caregivers if a person's weight has not been shifted within the desired time interval.

As noted herein, the video monitoring system 200 of FIG. 2 may employ multiple video cameras 210 to capture video frames for a specific room or area. Multiple video cameras 210 may enhance the ability of the processor system 220 to detect accurately events and/or to forecast events. When multiple video cameras 210 are used in this fashion, the video feeds from a camera may be synchronized to a common time reference so that video frames captured by different video cameras 210 at the same time may be compared, and to allow comparison of current video frame data extracted from a first video camera feed to be compared to video frame data extracted from previous video frames of a second video camera feed. In addition, the processor system 220 may include algorithms and instructions to resolves any conflicts in extracted video frame data from different video camera feeds. For example, a first video camera feed may provide a positive identification of vulnerable person 110 while a second video camera feed might show the same vulnerable person 110 as unknown due to lack of facial recognition resulting from a non-optimum camera angle.

The reliability of the video monitoring system 200 may be increased by implementing periodic health checks of the video cameras 210 and other components of the video monitoring system 200. Reliability may be increased by making the video cameras 210 incapable of manipulation or operation from the room or area in which they are installed, and by installing the cameras such that their optics cannot be covered by a towel, blanket, or similar object. Furthermore, the video cameras may be configured to provide a loss of image alert should the optics be covered or in other circumstances in which the video camera 210 is not able to transmit video frames or a person attempts to tamper with the camera 210. Still further, the video cameras 210 may be configured to send a loss of normal power signal to the processor system 220 upon loss of wired power.

In some installations, the video cameras 210 may be configured to record video frames periodically. In some installations, the video cameras 210 may incorporate a steerable optics system. In an aspect, the steerable optics system may be steered (left/right, up/down) by executing a steering program. In another aspect, the steerable optics system may, in addition, be manually steerable, but will return to programmed steering, or will return to a predetermined angle at a set time after manual steering operations. In some installations, the video camera 210 may incorporate zoom optics. In some installations, the video camera 210 may compress the video files using, for example, compression processes, in order to reduce transmission bandwidth.

In some installations, the processor system 220 may generate, provide, and display an alert upon loss of video feed from all cameras 210 installed in a room or area.

The video monitoring system 200 may be applied in a personal home setting as well as the environment 100 shown in FIG. 1. In this home environment, vulnerable persons normally require a caregiver to monitor them and assist them with activities of daily living. Caregiving can be a stressful, time consuming, and tiresome job. The video monitoring system 200 provides benefits to both the vulnerable person as well as the caregiver. For example, it is not feasible for a caregiver to physically watch the vulnerable person at all times. At some point, a caregiver will have to leave the vulnerable person to perform other duties or tasks, such as use the restroom, cook, or sleep. When the caregiver must leave the side of the vulnerable person, there is a risk that the vulnerable person will do something that risks of injury or an unwanted outcome. For example, a vulnerable person with dementia may fall or attempt to use a dangerous household object or appliance such as a knife, stove, or fireplace. Use of the such devices or appliances may pose risk to a person with dementia because of self-injury, or damage or destruction of the home. Furthermore, persons with dementia are at risk by wandering away from the caregiver. In addition to the risks to the vulnerable person, there is an associated high level of stress for the caregiver. The video monitoring system 200 addresses these problems by providing continuous, uninterrupted monitoring of the vulnerable person, along with an instantaneous alert to the caregiver in the event of an adverse or undesired such as a fall, use of certain objects or appliances, or exiting a room or the house. The video monitoring system 200 thus provides safety to the vulnerable person by ensuring constant monitoring, and provides peace of mind to the caregiver when leaving the side of the vulnerable person, thereby reducing stress for the caregiver.

In addition to the technological advances of current video monitoring systems disclosed herein, the video monitoring system 200 provides additional advances of current systems that may be employed the workflow of caregivers. For example, using the facial recognition processor 315 for both caregivers and patients, the system 200 may integrate with electronic medical record (EMR) systems used by healthcare facilities to automatically sign in a caregiver into the EMR and locate a patient chart using staff credentials and patient profile pictures in the EMR. This will improve efficiency for caregivers by forgoing manual log-ins. Furthermore, the system 200 allows for an automated and objective way of tracking patient-caregiver encounters. For example, at a certain time, nurse X interacted with patient Y. At a later time, nurse Z interacted with patient Y. The system 200 provides accurate and objective information about patient-caregiver encounters and ensures accountability.

The video monitoring system 200 also provides for longitudinal, automated, objective metric tracking that is significantly improved over current systems and methods. The objective metric tracking may be applied in various situations, including but not limited to rehabilitation, developmental milestones, and chronic degenerative diseases. Metrics that may be tracked include, but are not limited to, steps taken, distance walked, sleep activity, and changes in gait (stride length, speed, posture, symmetry). Objective data that is constantly collected over an extended period of time may be used to identify trends, and thus identify changes in a person's condition, such as progress in rehabilitation, or deterioration with a degenerative disease.

Certain of the devices shown in FIGS. 2-4 include a computing system. The computing system includes a processor (CPU) and a system bus that couples various system components including a system memory such as read only memory (ROM) and random-access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying description to illustrate the examples represented in FIGS. 21, 22, and 24-26. The disclosed devices, components, and systems contemplate using or implementing any suitable technique for performing the steps illustrated. Thus, FIGS. 21, 22, and 24-25 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples may be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for automated, private, and, personalized metric analyses of persons, comprising:
   a video camera system;
   a processor system configured to receive data from the video camera system; and
   a non-transitory, computer-readable storage medium having encoded thereon, machine instructions executable by the processor system to process raw image data of video frames captured by the video camera system, wherein the processor system:

for a first video frame, executes video frame operations to produce distilled, contextualized data, comprising:
  detects person objects in the first video frame;
  detects and identifies non-person objects in the first video frame;
  identifies and classifies a person object as a person for metric analysis; and
  determines a posture of the person,
repeats the video frame operations for second and subsequent video frames,
identifies changes in posture of the person from the second and subsequent video frames,
using the changes in posture, determines motion of the person,
provides person privacy, comprising automatically and immediately following each video frame operation on a video frame, deletes all raw image data of the video frame, and
based on the posture changes and the motion, generates a private, personalized metric analysis for the person.

2. The system of claim 1, wherein the processor system comprises a first processor built into a first video camera, wherein the first video camera buffers video frames and provides the buffered video frames to the first processor on a rolling basis, wherein the raw image data of the video frames never leave confines of the first video camera, all processing executed by the processor system is completed within the first video camera, and only the distilled and contextualized data are provided to components external to the system.

3. The system of claim 1, wherein the private and personalized metric analyses comprise outcome measures of interest selected from a group consisting of steps taken/distance walked/changes in gait by elderly persons, positional changes for bedridden persons, and developmental milestones in child persons,
  wherein the metric analyses are conducted over time to identify trends and corresponding changes in a health condition of the person, comprising progress in rehabilitation, deterioration from a degenerative disease, and physical and mental development.

4. The system of claim 1, the video camera system comprising two or more video cameras for metric analysis of a single person.

5. The system of claim 1, wherein determining the posture of the person comprises the processor system:
  identifying a plurality of body parts of the person, respective orientations of the body parts, and relations of the body parts to the non-person objects; and
  comparing the respective orientations of the body parts relative to one or more of a vertical plane and a horizontal plane.

6. The system of claim 1, wherein the processor system determines the posture of the person using a trained posture recognition algorithm, wherein the algorithm is trained using a neural network, wherein the processor system executes the posture recognition algorithm to recognize objects in raw image data contained in video frames by segmenting the video frames to identify relevant structures consisting of floors, walls, ceilings, doors and windows visible to the video camera.

7. The system of claim 6, wherein processor system executes the posture recognition algorithm to analyze positions of joints and anatomical landmarks of the person in relation to each other.

8. The system of claim 6, wherein to identify postures of person objects; correctly relate detected objects to segments; and to track detected objects, frame-to-frame, the trained algorithm is applied to a test frame, or frames having known objects and segments, to verify proper and satisfactory operation.

9. The system of claim 6, wherein to classify the identified person object as the person for metric analyses, the processor:
  generates a bounding box encompassing the identified person object; and
  applies a facial recognition algorithm only to the identified image object encompassed in the bounding box.

10. The system of claim 9, wherein the processor system compares a person's posture as determined from a current video frame to the person's posture in previous video frames in order to compute how a person is moves or changes posture, comprising detecting movement of joints frame-to-frame;
  determining a rapidity of joint and posture changes based on a number of video frames over which joint motion is detected; and
  classifying the person's motion as one of intentional and not-intentional based on the detected movement and the determined rapidity.

11. The system of claim 9, comprising relating the person to a vertical plane (i.e., a plane parallel to wall segments of a room) and/or a horizontal plane (i.e., a plane parallel to a floor segment of a room).

12. The system of claim 1, wherein raw image data present in a current video frame are not sufficient to identify a person object;
  wherein the processor system accesses data distilled from prior frames to confirm an identity of the person object.

13. The system of claim 1, wherein the processing system is external to and in communication with the video camera system.

14. The system of claim 13, wherein the video camera system sends video frames to processor system automatically, based on one or more of detected movement of the person object and periodically/regularly.

15. The system of claim 1, wherein the processor system executes a person object movement algorithm to follow identified person objects; and
  wherein the person object movement algorithm combines information from a history of known image object locations within a scene to compute how a person object moves between video frames;
  wherein person objects are time-stamped with a time stamp time registered to the video frame and annotated with video camera identification.

16. The system of claim 15, wherein the person's posture and movements of the person are saved and provided for use in further operations of the processor system.

17. A system for automated, private, and, personalized metric analyses of persons, comprising:
  a video camera;
  a processor integral to and contained within the video camera, and configured to receive image data captured by the video camera; and
  a non-transitory, computer-readable storage medium having encoded thereon, machine instructions executable by the processor system to process raw image data of video frames captured by the video camera, wherein the processor:
    for a first video frame, executes video frame operations, comprising:

detects person objects in the first video frame;
detects and identifies non-person objects in the first video frame;
identifies and classifies a person object as a person for metric analysis; and
determines a posture of the person,
repeats the video frame operations for second and subsequent video frames,
identifies changes in posture of the person from the second and subsequent video frames,
using the changes in posture, determines motion of the person,
provides person privacy, comprising automatically and immediately following each video frame operation on a video frame, deletes all raw image data of the video frame, and
based on the posture changes and the motion, generates a private, personalized metric analysis for the person.

18. The system of claim 17, wherein the video camera buffers video frames and provides the buffered video frames to the processor on a rolling basis, wherein the raw image data of the video frames never leave confines of the video camera, all processing executed by the processor is completed within the video camera, and only analyzed and contextualized data are provided to components external to the video camera.

19. The system of claim 17, wherein the private and personalized metric analyses comprise outcome measures of interest selected from a group consisting of steps taken/distance walked/changes in gait by elderly persons, positional changes for bedridden persons, and developmental milestones in child persons,
wherein the metric analyses are conducted over time to identify trends and corresponding changes in a health condition of the person, comprising progress in rehabilitation, deterioration from a degenerative disease, and physical and mental development.

20. A method for monitoring health and well-being of persons, comprising:
a processor integral to a video camera capturing video frames comprising raw image data of a scene containing person objects and non-person objects;
the processor, for a first video frame, executing video frame operations, comprising:
detecting the person objects in the first video frame,
detecting and identifying the non-person objects in the first video frame,
identifying and classifying a person object as a person for metric analysis, and
determining a posture of the person;
the processor repeating the video frame operations for second and subsequent video frames;
identifying changes in posture of the person from the second and subsequent video frames;
using the changes in posture, determining motion of the person;
providing person privacy, comprising automatically and immediately following each video frame operation on a video frame, deleting all raw image data of the video frame; and
based on the posture changes and the motion, generating a private, personalized metric analysis for the person.

21. The method of claim 20, wherein the private, personalized metric analysis comprises outcome measures of interest selected from a group consisting of steps taken/distance walked/changes in gait by elderly persons, positional changes for bedridden persons, and developmental milestones in child persons,
wherein the processor conducts the metric analyses over time to identify trends and corresponding changes in a health condition of the person, comprising progress in rehabilitation, deterioration from a degenerative disease, and physical and mental development.

22. A system for automated, private, and, personalized metric analyses of persons, comprising:
a video camera;
a processor integral to and contained within the video camera, and configured to receive image data captured by the video camera; and
a non-transitory, computer-readable storage medium having encoded thereon, machine instructions executable by the processor system to process raw image data of video frames captured by the video camera, wherein the processor:
for a first video frame, executes first video frame operations, comprising:
detects person objects in the first video frame;
determines locations of the detected person objects; and
compares the locations to prior locations of the detected person objects and identifies that at least one person object changed position from a prior video frame,
for the first video frame, executes second video frame operations, comprising:
detects and identifies non-person objects in the first video frame;
identifies and classifies a person object as a person for metric analysis; and
determines a posture of the person,
repeats the first and second video frame operations for second and subsequent video frames,
identifies changes in posture of the person from the second and subsequent video frames,
using the changes in posture, determines motion of the person,
provides person privacy, comprising automatically and immediately following each video frame operation on a video frame, deletes all raw image data of the video frame, and
based on the posture changes and the motion, generates a private, personalized metric analysis for the person.

* * * * *